(12) United States Patent
Park et al.

(10) Patent No.: US 12,320,629 B2
(45) Date of Patent: Jun. 3, 2025

(54) THIN FILM CHARACTERISTIC MEASURING APPARATUS

(71) Applicant: LG ELECTRONICS INC., Seoul (KR)

(72) Inventors: Jun Park, Seoul (KR); Seh Won Ahn, Seoul (KR); Yun Suk Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 226 days.

(21) Appl. No.: 17/928,642

(22) PCT Filed: Jun. 1, 2020

(86) PCT No.: PCT/KR2020/007098
§ 371 (c)(1),
(2) Date: Nov. 30, 2022

(87) PCT Pub. No.: WO2021/246540
PCT Pub. Date: Dec. 9, 2021

(65) Prior Publication Data
US 2023/0175834 A1    Jun. 8, 2023

(51) Int. Cl.
*G01B 11/06*    (2006.01)
*G02B 7/182*    (2021.01)
(Continued)

(52) U.S. Cl.
CPC ........ *G01B 11/0625* (2013.01); *G02B 7/1821* (2013.01); *G02B 9/62* (2013.01); *G02B 27/30* (2013.01)

(58) Field of Classification Search
CPC .. G01B 11/0625; G01B 11/02; G02B 7/1821; G02B 9/62; G02B 27/30; G02B 13/0005;
(Continued)

(56) References Cited

U.S. PATENT DOCUMENTS 5,087,987 A * 2/1992 Simbal ............... G02B 13/0005
359/663
7,286,242 B2   10/2007 Kim et al.
(Continued)

FOREIGN PATENT DOCUMENTS

CN       104029394 B      5/2017
JP       2010-197300 A    9/2010
KR   10-2012-0081419 A    7/2012

*Primary Examiner* — Jonathan M Hansen
(74) *Attorney, Agent, or Firm* — Birch, Stewart, Kolasch & Birch, LLP

(57) ABSTRACT

Disclosed is a thin film characteristic measuring apparatus, which is used for measuring the thickness or width of a thin film of an object to be examined. The thin film characteristic measuring apparatus comprises a light source, a first reflecting mirror, a first actuator and a lens assembly. The lens assembly is formed so that the angle formed by an optical axis and a chief ray of the rays transmitted through the lens assembly is less than or equal to the angle formed by the optical axis and a chief ray of the rays incident to the lens assembly. The light source can comprise superluminescent diodes (SLD). Provided is the thin film characteristic measuring apparatus, which enables the light transmitted through the lens assembly to reciprocate on an incident surface of the object to be examined while the first reflecting mirror repeatedly tilts within a predetermined angle range, and thus can accurately measure a relatively large area and can variously control a position to be measured, a method and the like.

18 Claims, 19 Drawing Sheets

(51) Int. Cl.
*G02B 9/62* (2006.01)
*G02B 27/30* (2006.01)

(58) Field of Classification Search
CPC .. G02B 26/101; G02B 26/105; G02B 3/0006;
G02B 5/08; G02B 5/18; G01N 21/8422
See application file for complete search history.

(56) References Cited

U.S. PATENT DOCUMENTS

| | | |
|---|---|---|
| 9,606,269 B2 * | 3/2017 | Kumar ................ G02B 3/12 |
| 2002/0089654 A1 * | 7/2002 | Ota ................ G03F 7/70108 |
| | | 355/53 |
| 2005/0018289 A1 * | 1/2005 | Yanowitz ........... G03F 7/70258 |
| | | 359/462 |
| 2007/0247630 A1 | 10/2007 | Herring |
| 2012/0176623 A1 | 7/2012 | Lee et al. |
| 2016/0153771 A1 * | 6/2016 | Aoto ................ G01B 9/0209 |
| | | 356/497 |
| 2018/0164089 A1 * | 6/2018 | Schönleber ........ G01B 9/02035 |
| 2019/0044494 A1 | 2/2019 | Abatake et al. |
| 2020/0103220 A1 | 4/2020 | Kimura et al. |

* cited by examiner (a)

(b)

(c)

(d)

(e)

(f)

(a)

(b)

(c)

(d)

(e)

(f)

THIN FILM CHARACTERISTIC MEASURING APPARATUS

CROSS REFERENCE TO RELATED APPLICATIONS

This application is the National Phase of PCT/KR2020/007098 filed on Jun. 1, 2020, which is hereby expressly incorporated by reference into the present application.

TECHNICAL FIELD

The present invention is an apparatus used to measure the characteristics of a thin film of a subject by using an interference phenomenon between wavelengths of reflected ray after being irradiated to the subject.

BACKGROUND

In optical disks, semiconductors, batteries, and various displays, thin films constituting each of these are formed, and in the manufacturing process thereof, measurement of the thickness and refractive index of the thin film is required.

The thickness and refractive index of the thin film may be measured by reflectometry, and the reflectometer may correspond to a thin film layer measurement system. The reflectometer is a non-contact, non-destructive measuring apparatus that can measure the characteristics of a multi-layer thin film, and has the advantage of being able to measure without special preparation or processing of a subject.

In this regard, U.S. Pat. No. 7,286,242 B2 (hereinafter, 'prior document') discloses Apparatus for Measuring Characteristics of Thin Film by Means of Two-dimensional Detector and Method of Measuring the Same.

The thickness of the thin film may be measured on a sample substrate made of a substrate and a thin film by the apparatus according to the prior document.

A ray irradiated from a light source is incident on a substrate having a thin film through a beam splitter and a lens 26.

Among the ray incident on the sample substrate, some is reflected from the surface of the thin film, and the other part may be reflected at the boundary between the substrate and the thin film after passing through the thin film, and the two reflected rays have differences in optical paths.

As such, the rays reflected from different surfaces of the sample substrate have differences in optical paths, and an interference phenomenon occurs due to the differences in optical paths. In addition, the differences in paths occur for each wavelength, and constructive interference or destructive interference is generated according to the wavelength of the light beam.

The rays reflected from the sample substrate are projected on a spectroscope, and the spectroscope analyzes the projected reflected ray to obtain the intensity of the reflected ray as a function of the light wavelength. The result passes through a numeric converter and an information processor, and the thickness, refractive index, etc. of the thin film of the sample substrate are calculated accordingly to obtain a measured value.

However, in the case of the apparatus and method according to the prior art, since only the thickness measurement can be made at any one spot of the sample substrate, the development of a thin film characteristic measuring apparatus capable of variously adjusting a position, a method, etc., to be measured is required.

DISCLOSURE OF INVENTION

Technical Problem

An object to be achieved by the present invention is to provide a thin film characteristic measuring apparatus that can effectively and accurately measure the thickness and/or width of a thin film of a subject in a region exceeding the size (diameter) of a ray irradiated to the subject.

Another object to be achieved by the present invention is to provide a thin film characteristic measuring apparatus in which a ray irradiated to a subject is repeatedly deformed at a position thereof, and is incident and reflected in a direction perpendicular to the surface of the subject.

Yet another object to be achieved by the present invention is to provide a thin film characteristic measuring apparatus which can effectively measure a thin film of a subject having a curved surface.

Still yet another object to be achieved by the present invention is to provide a thin film characteristic measuring apparatus which can simultaneously measure several parts of the subject.

Solution to Problem

A thin film characteristic measuring apparatus according to an embodiment of the present invention is an apparatus used for measuring a thickness and/or a width of a thin film of a subject.

The thin film characteristic measuring apparatus includes a light source, a first reflection mirror, a first actuator, and a lens assembly.

The light source may be configured by a superluminescent diode (SLD).

The first reflection mirror reflects a ray irradiated from the light source.

The first actuator reciprocates and tilts a first reflection mirror in a predetermined angle range.

The lens assembly includes a plurality of lenses, and is configured so that the ray reflected by the first reflection mirror is incident and transmitted.

The lens assembly is configured so that an angle between a main light beam the ray transmitted through the lens assembly and an optical axis of the lens assembly is equal to or smaller than an angel between the main light beam of the ray incident on the lens assembly and the optical axis of the lens assembly.

The thin film characteristic measuring apparatus may be configured so that when the angle between the main ray of the ray incident on the lens assembly and the optical axis is 0 to 3.7°, the angle between the main ray of the ray transmitted through the lens assembly and the optical axis is 0 to 0.1°.

The ray irradiated from the light source may have a center wavelength of 800 to 900 nm and a bandwidth of 100 to 200 nm.

The light source may include the optical fiber delivering the ray.

The optical fiber may have a diameter of 10 μm or less and a numerical aperture (NA) of 0.3 or less.

The thin film characteristic measuring apparatus may further include a collimator positioned between the light source and the first reflection mirror.

The numerical aperture (NA) of the collimator is larger than the NA of the optical fiber.

A size (diameter) of the ray passing through the collimator is 50 to 200 µm.

In the thin film characteristic measuring apparatus, the angle between the main ray of the ray incident on the lens assembly may be controlled by the first actuator.

A center of the first reflection mirror may be positioned on an extension line of the optical axis of the lens assembly.

The thin film characteristic measuring apparatus may further include a second reflection mirror reflecting the ray reflected by the first reflection mirror; and a second actuator reciprocating and tilting the second reflection mirror in a predetermined angle range.

In the thin film characteristic measuring apparatus, the ray reflected by the second reflection mirror may be incident on the lens assembly.

The thin film characteristic measuring apparatus may further include a first transparent plate through which the ray irradiated from the light source is transmitted; a third actuator reciprocating and tilting the first transparent plate in a predetermined angle range; a second transparent plate through which the ray transmitted through the first transparent plate is transmitted; and a fourth actuator reciprocating and tilting the second transparent plate in a predetermined angle range.

A tilting axis of the first transparent plate and a tilting axis of the second transparent plate may be different from each other.

The ray transmitted through the second transparent plate may be refracted by the first reflection mirror and the second reflection mirror, and then incident on the lens assembly.

The lens assembly may include a first lens, a second lens, a third lens, a fourth lens, and a fifth lens.

The first lens is configured by a negative lens.

The second lens is disposed behind the first lens, and configured by a positive lens.

The third lens is disposed in front of the first lens, and configured by the positive lens.

The fourth lens is disposed between the third lens and the first lens, and configured by a positive lens.

The fifth lens is disposed between the third lens and the first lens, and configured by a negative lens.

The lens assembly may further include a sixth lens.

The sixth lens is disposed between the fifth lens and the first lens, and configured by the positive lens.

The fourth lens may be disposed in front of the fifth lens.

FL1 which is a sum of focal distances of the third lens, the fourth lens, the fifth lens, and the fifth lens may be shorter than FL2 which is a sum of focal distances of the third lens, the fourth lens, the fifth lens, the sixth lens, and the first lens.

A focal length FL3 the second lens 72 may be longer than the FL1 and shorter than the FL2.

In the thin film characteristic measuring apparatus, when a diameter of an area formed by a ray incident on the third lens parallel to the optical axis of the lens assembly is D1, a diameter of an area formed when the ray transmitted through the lens assembly touches a surface of the subject is D2, the sum of the focal distances of the third lens, the fourth lens, the fifth lens, the sixth lens, and the first lens is FL2, and the focal distance of the second lens is FL3, a value of FL3/FL2 may be within a range of +10% of a value of D2/D1.

In the thin film characteristic measuring apparatus, when a distance between the first reflection mirror and the third lens is L1, and a distance between the second lens and the subject is L2, L1 and L2 may be 20 mm or more, and an effective focal distance of the lens assembly may be 85 mm.

The first lens may be an asymmetrical biconcave lens.

The second lens may be a plano-convex lens.

The third lens may be a positive meniscus lens.

The fourth lens may be an asymmetrical double-convex lens.

The fifth lens may be a plano-concave lens.

The sixth lens may be an asymmetrical double-convex lens.

The thin film characteristic measuring apparatus may include a collimator positioned between the light source and the first reflection mirror, and a case to which the lens assembly and the first actuator are fixed, and which accommodates the first reflection mirror, and is opened toward the collimator.

A plurality of heat dissipation fins may be formed in the first actuator.

The thin film characteristic measuring apparatus may further include a diffractive optical element positioned between the light source and the lens assembly.

Advantageous Effects of Invention

The thin film characteristic measuring apparatus according to an embodiment of the present invention includes a light source, a first reflection mirror, a first actuator, and a lens assembly. The light source irradiates a ray, the first actuator reciprocates and tilts the first reflection mirror in a predetermined angle range, and a ray reflected by the first reflection mirror is incident on the lens assembly and transmitted toward a subject. The lens assembly is configured so that an angle between a main light beam the ray transmitted through the lens assembly and an optical axis of the lens assembly is equal to or smaller than an angel between the main light beam of the ray incident on the lens assembly and the optical axis of the lens assembly. Therefore, a thin film characteristic measuring apparatus can be provided, in which the ray can be incident and reflected toward the subject at various different spots in a predetermined section or a region, and in this case, rays at respective spots may be maintained to be parallel to each other, and an area, a region, or a method to be inspected can be variously adjusted.

Further, the thin film characteristic measuring apparatus according to an embodiment of the present invention is configured to include the first reflection mirror, the first actuator, and the lens assembly, and as a result, the ray irradiated to the subject can be incident and reflected in a direction perpendicular to the surface of the subject while being repeatedly deformed at a position thereof, and the thickness and/or the width of the thin film of the subject can be effectively and accurately measured.

The thin film characteristic measuring apparatus according to an embodiment of the present invention can be configured to include a first transparent plate, a third actuator, a second transparent plate, and a fourth actuator. As a result, the position of the ray incident on the subject can be effectively converted, and further, the angle of the ray incident on the subject can be effectively converted, and by the thin film characteristic measuring apparatus according to an embodiment of the present invention, the thin film of the subject having the curved surface can be effectively measured.

The thin film characteristic measuring apparatus according to an embodiment of the present invention can be configured to further include a diffractive optical element positioned between the light source and the lens assembly. A thin film f characteristic measuring apparatus can be provided, in which the ray incident on the lens assembly by the refraction element can be split into several rays, and then incident on the lens assembly, and as a result, several parts of the subject can be simultaneously measured.

BRIEF DESCRIPTION OF THE DRAWINGS

In FIGS. 1 and 2, a lens assembly is illustrated in a sectional shape, and a case is represented by dotted lines.

Figure 3A:
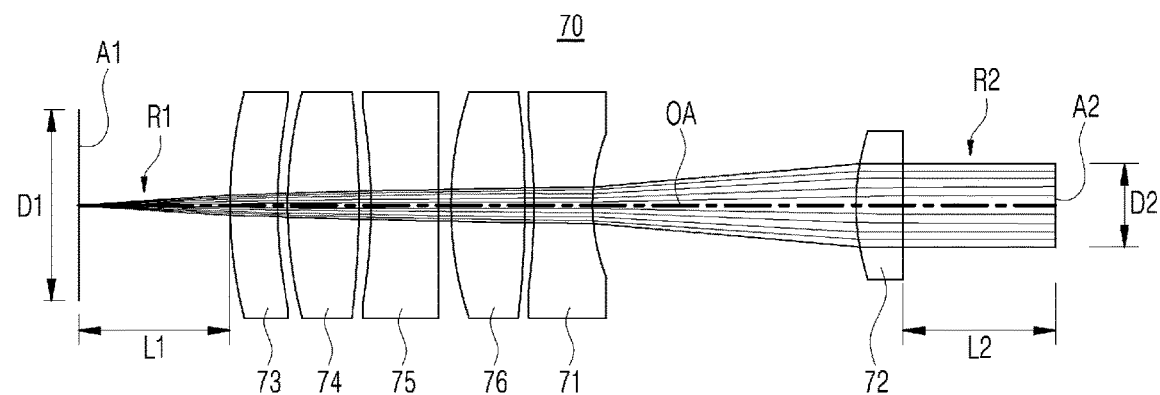
FIG. 3A is a diagram schematically illustrating sections of lenses constituting the lens assembly and rays which are incident on and transmitted to the lens assembly on an optical axis of the lens assembly.
Figure 3B:
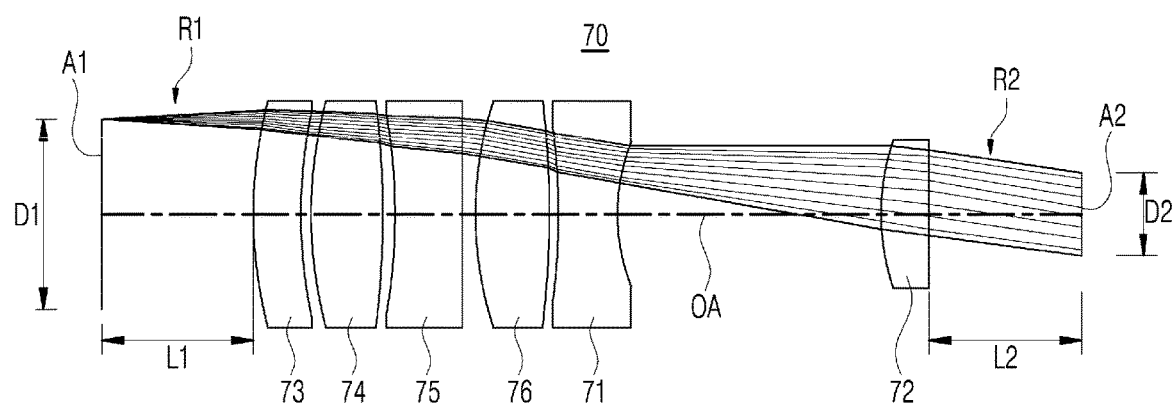
Figure 3C:
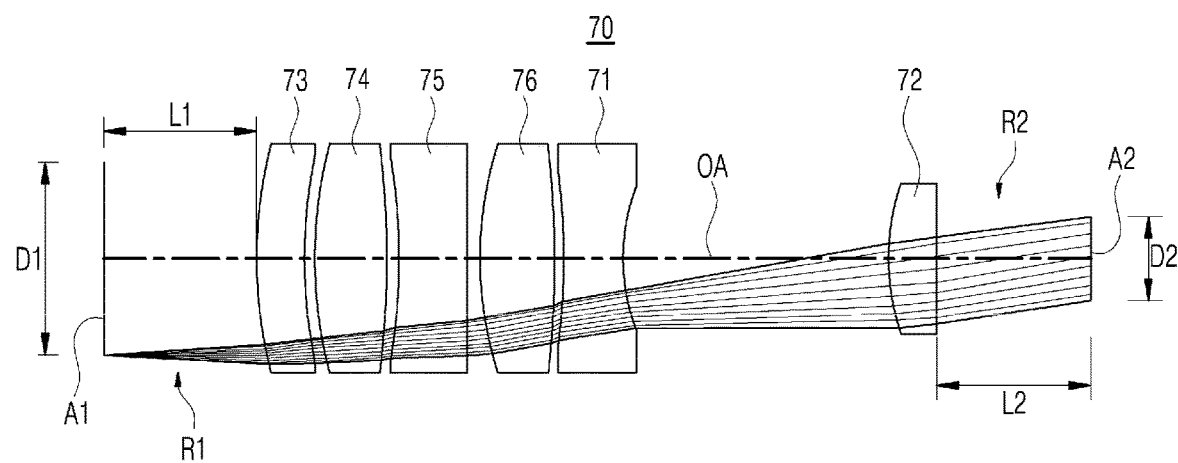

Each of FIGS. 3B and 3C is a diagram schematically illustrating rays incident on and transmitted to the lens assembly at a spot (off axis) spaced apart from the optical axis of the lens assembly in the lens assembly of FIG. 3A.

Figure 4:
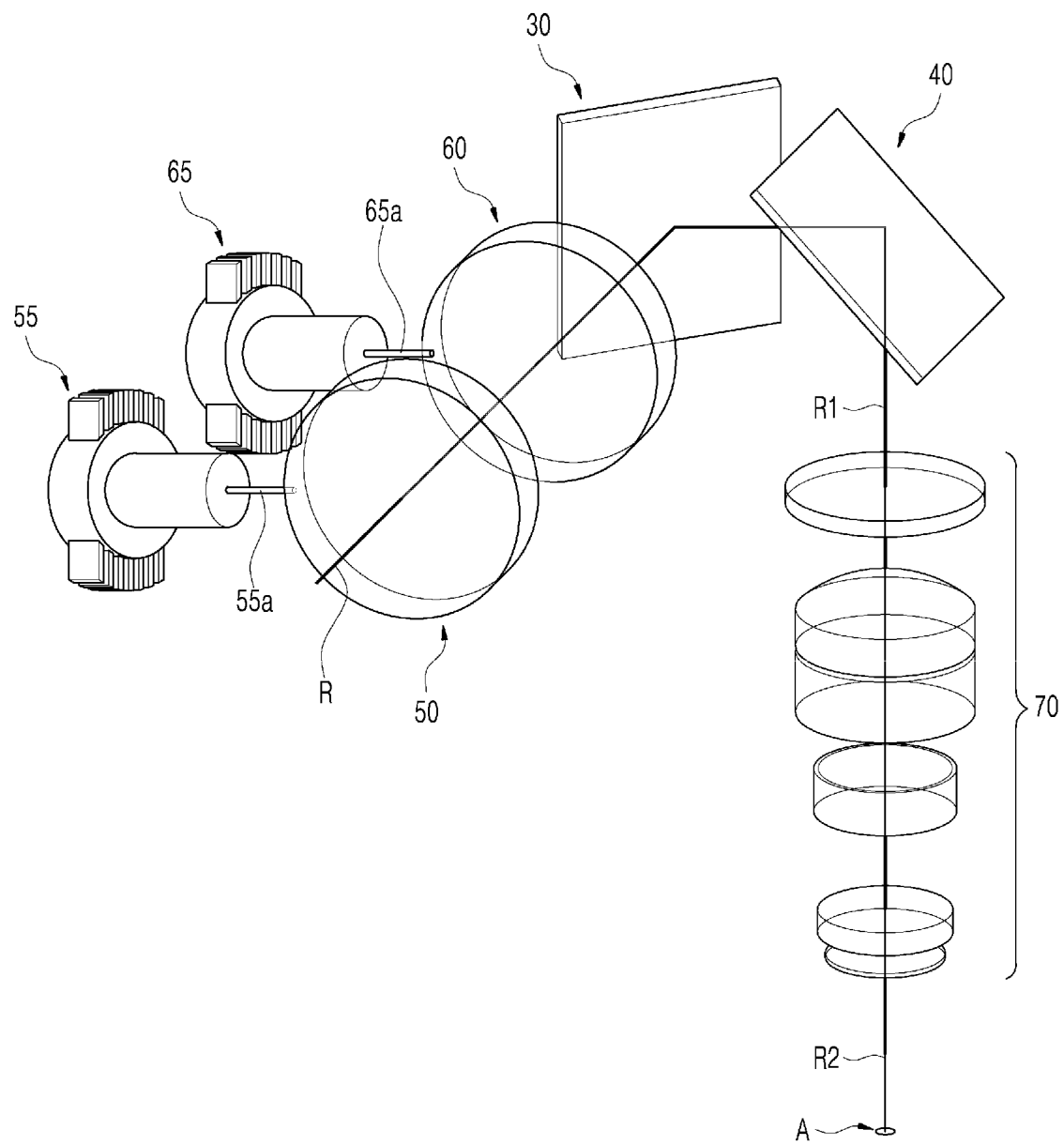

FIG. 4 is a diagram schematically illustrating some components of the thin film characteristic measuring apparatus and rays transmitted through and reflected on the components.

Figure 5:
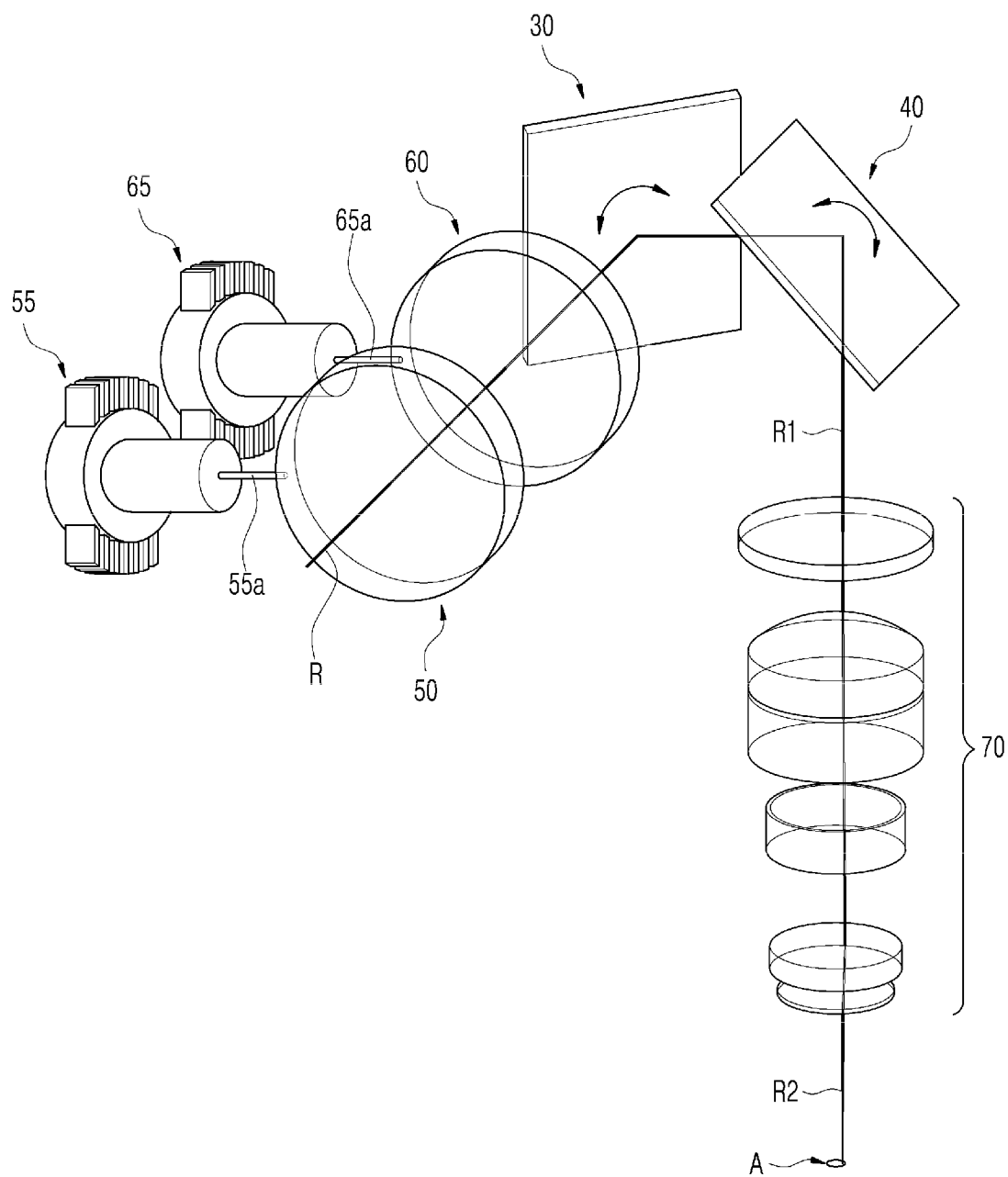

FIG. 5 is a diagram illustrating a state in which a first reflection mirror and a second reflection mirror are tilted in the thin film characteristic measuring apparatus of FIG. 4.

Figure 6:
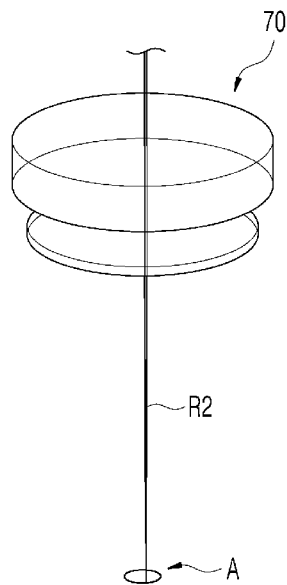
Figure 6:
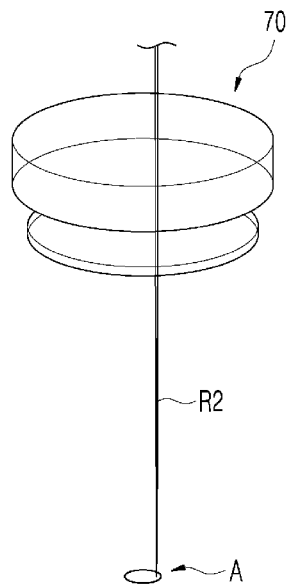
Figure 6:
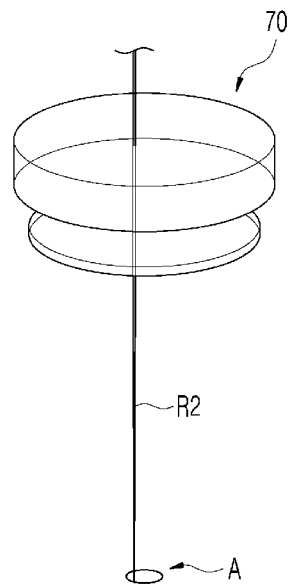
Figure 6:
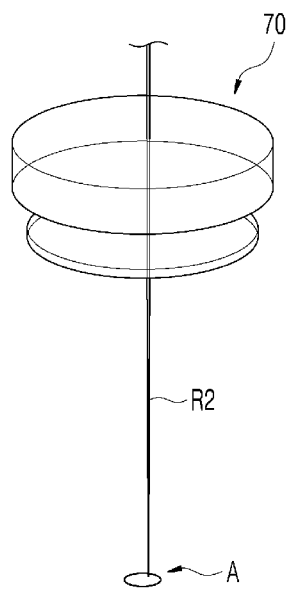
Figure 6:
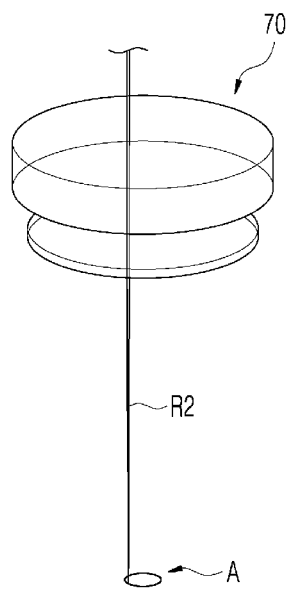
Figure 6:
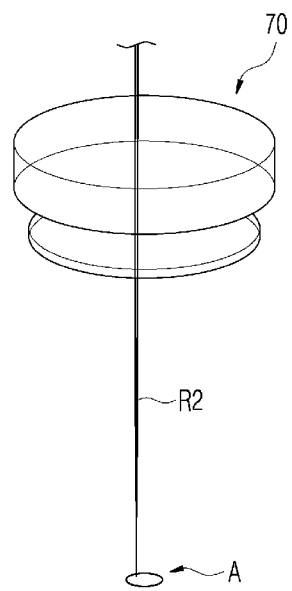

FIG. 6 is a diagram illustrating a state in which rays transmitted through the lens assembly travels differently according to degrees at which the first reflection mirror and the second reflection mirror are tilted in the thin film characteristic measuring apparatus of FIGS. 4 and 5.

Figure 7:
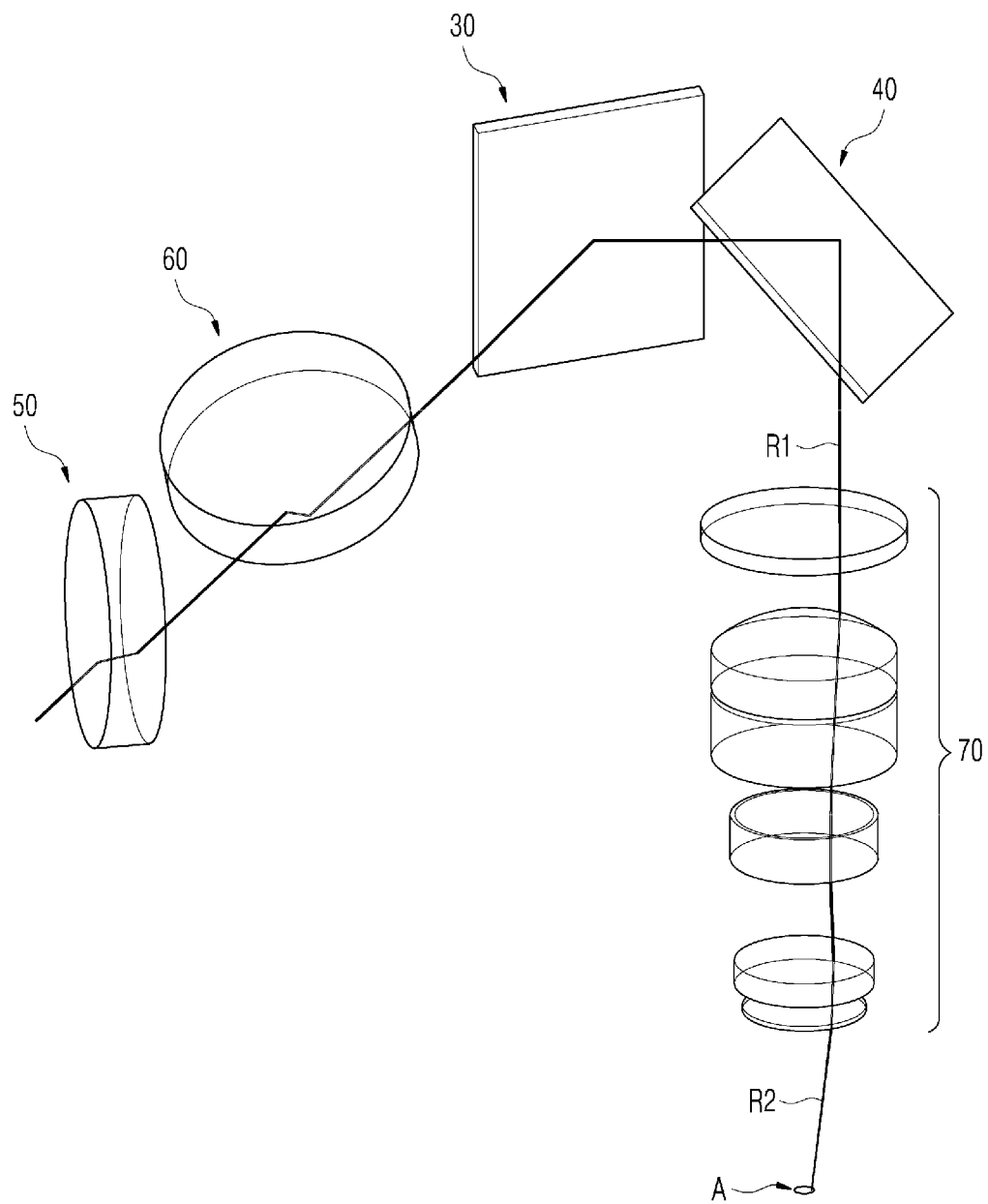

FIG. 7 is a diagram illustrating a state in which a first transparent plate and a second transparent plate are tilted in the thin film characteristic measuring apparatus of FIG. 4.

Figure 8:
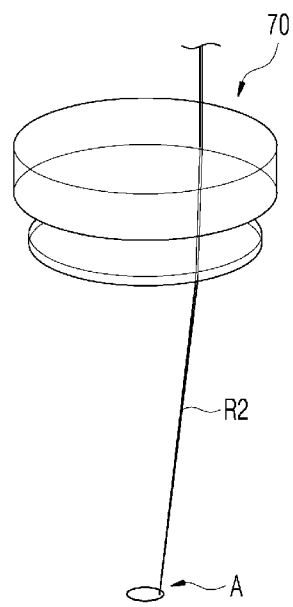
Figure 8:
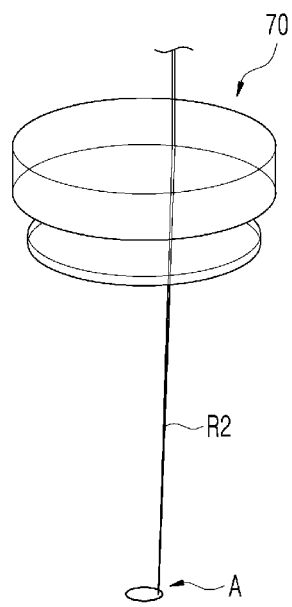
Figure 8:
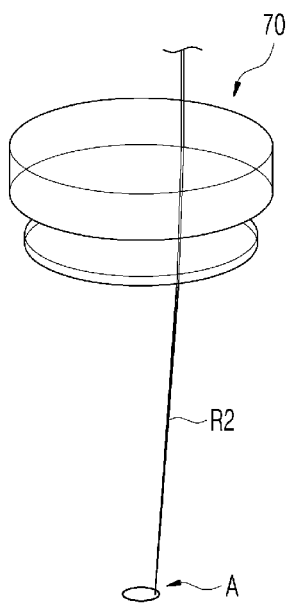
Figure 8:
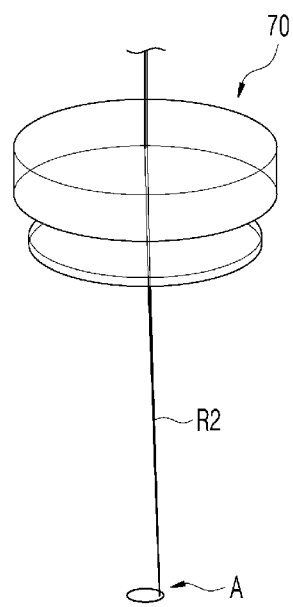
Figure 8:
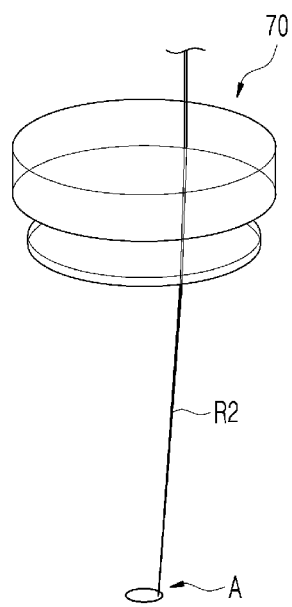
Figure 8:
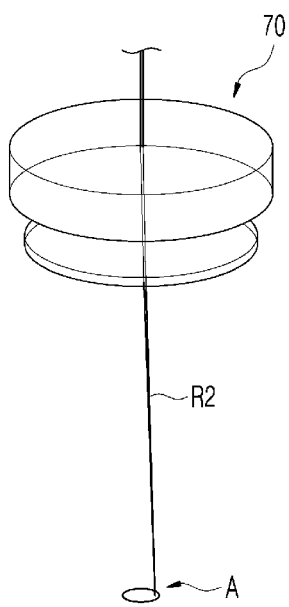

FIG. 8 is a diagram illustrating a state in which the rays transmitted through the lens assembly travels differently according to degrees at which the first transparent plate and the second transparent plate are tilted in the thin film characteristic measuring apparatus of FIGS. 4 and 7.

Figure 9A:
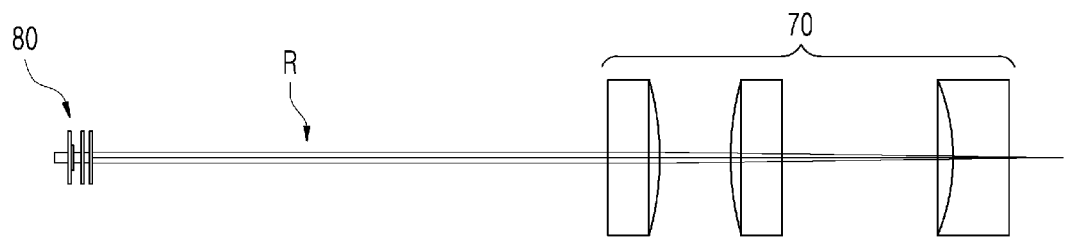
Figure 9B:
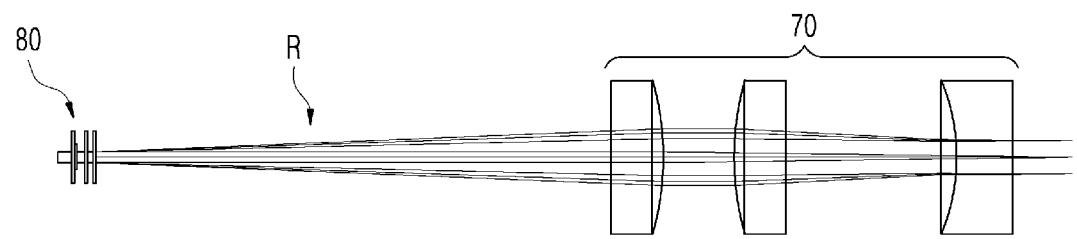
Figure 9C:
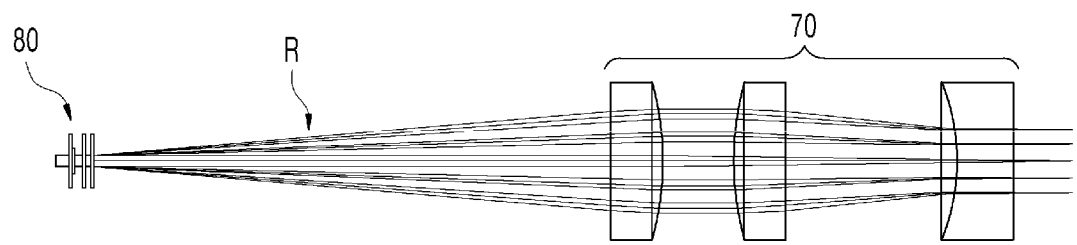

Each of FIGS. 9A, 9B, and 9C is a diagram schematically illustrating a state in which rays having the refraction element move.

Figure 10:
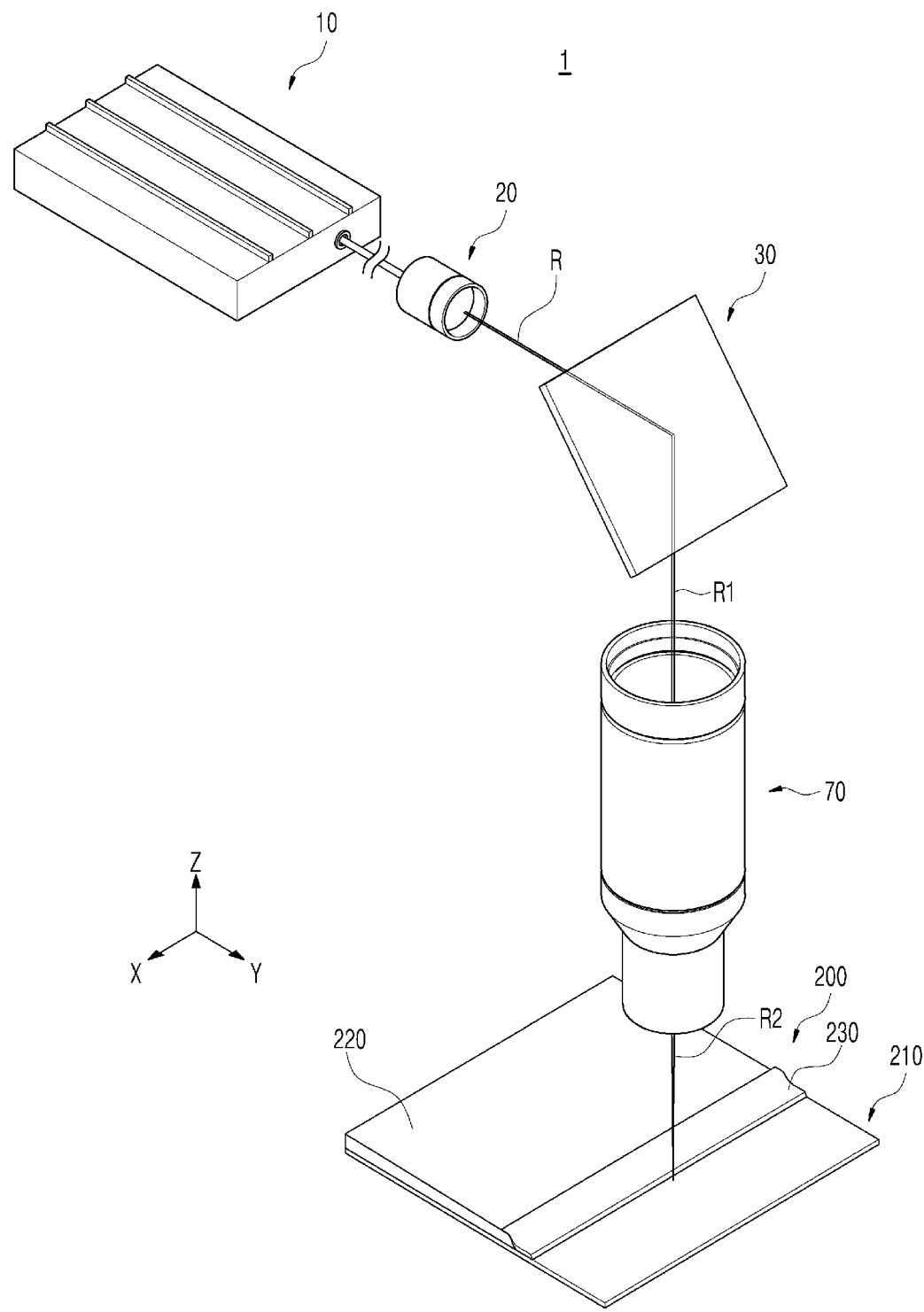

FIG. 10 is a diagram schematically illustrating a state of inspecting the subject by using the thin film characteristic measuring apparatus.

Figure 11:
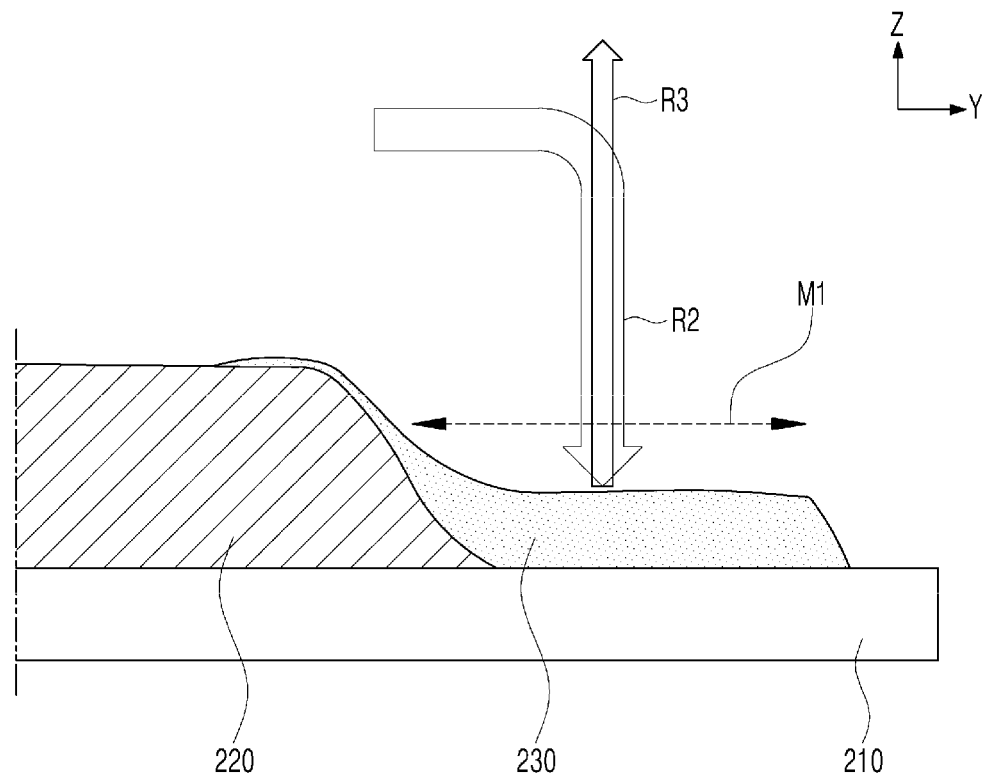

FIG. 11 is a diagram schematically illustrating the section of the subject of FIG. 10 and the ray incident on and reflected on the subject.

Figure 12A:
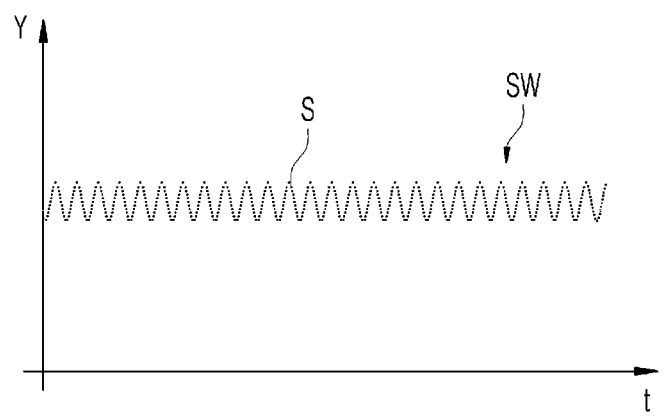
Figure 12B:
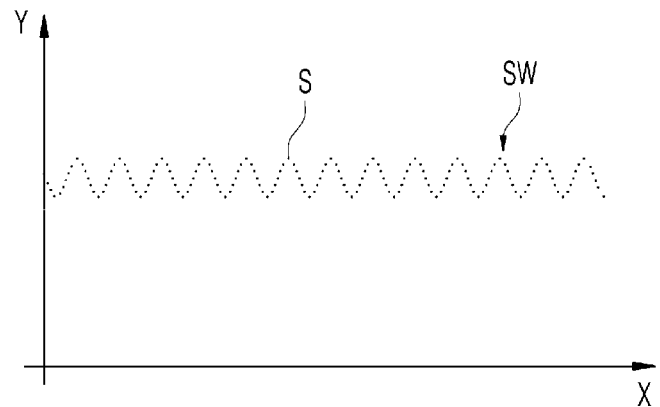
Figure 12C:
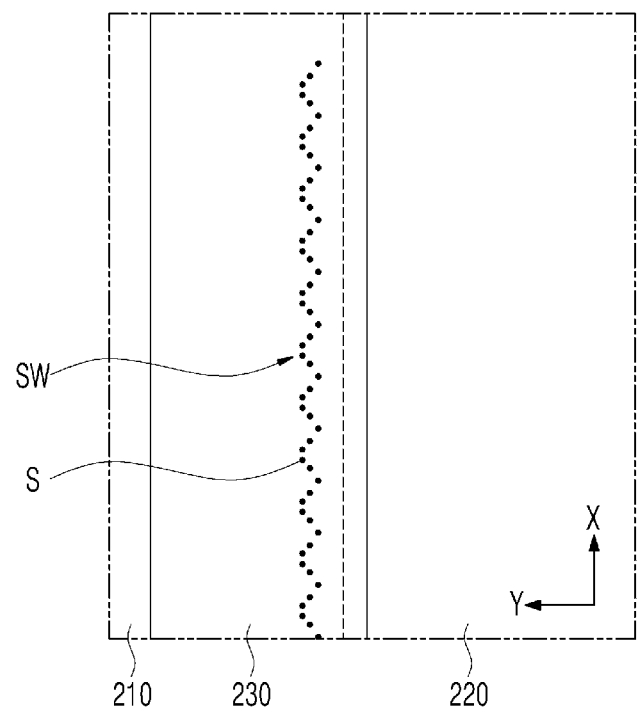

FIG. 12A is a diagram illustrating a position of the ray incident on the subject by a graph according to a time in the thin film characteristic measuring apparatus according to an embodiment, FIG. 12B is a graph considering movement of the subject in the graph of FIG. 12A, and FIG. 12C is a diagram illustrating rays incident on the surface of the subject.

Figure 13A:
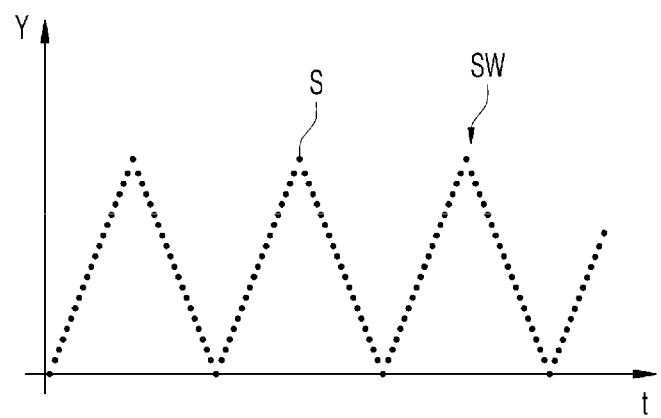
Figure 13B:
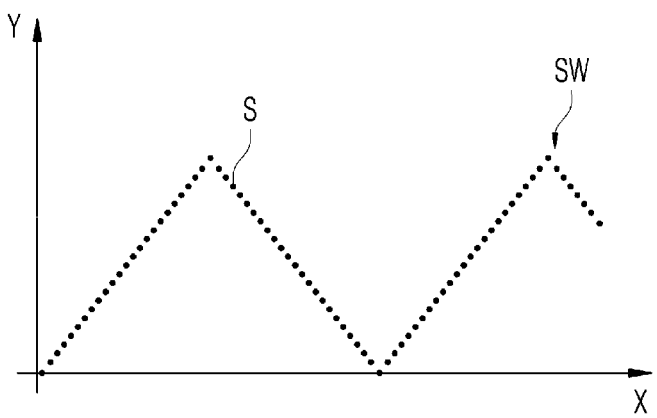
Figure 13C:
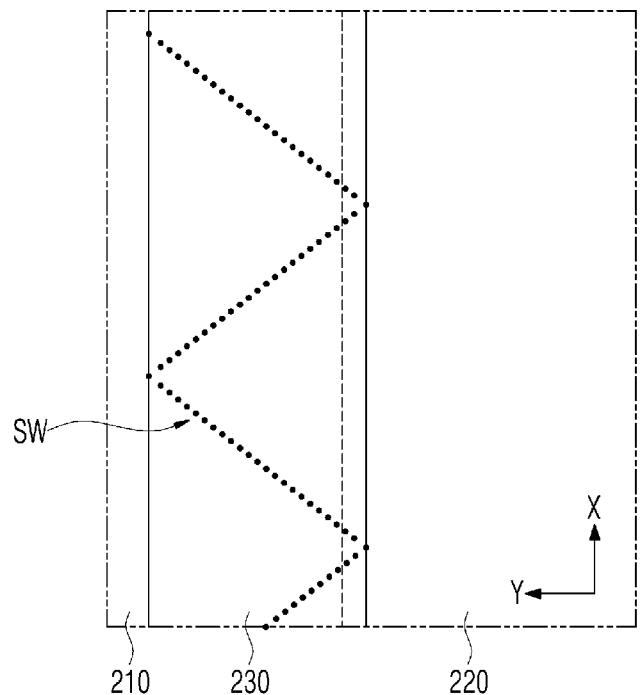

FIG. 13A is a diagram illustrating a position of the ray incident on the subject by a graph according to a time in a thin film characteristic measuring apparatus according to another embodiment, FIG. 13B is a graph considering movement of the subject in the graph of FIG. 13A, and FIG. 13C is a diagram illustrating rays incident on the surface of the subject.

Figure 14A:
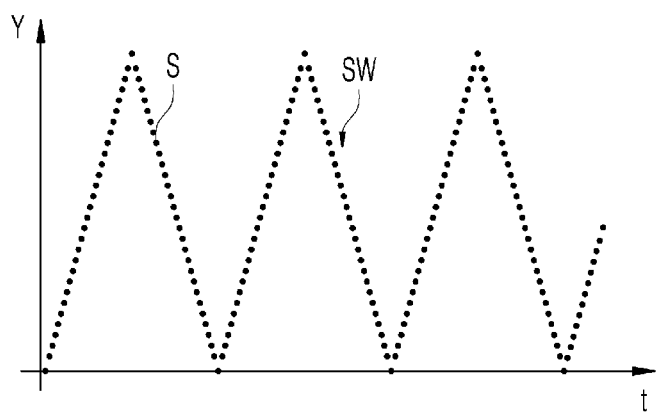
Figure 14B:
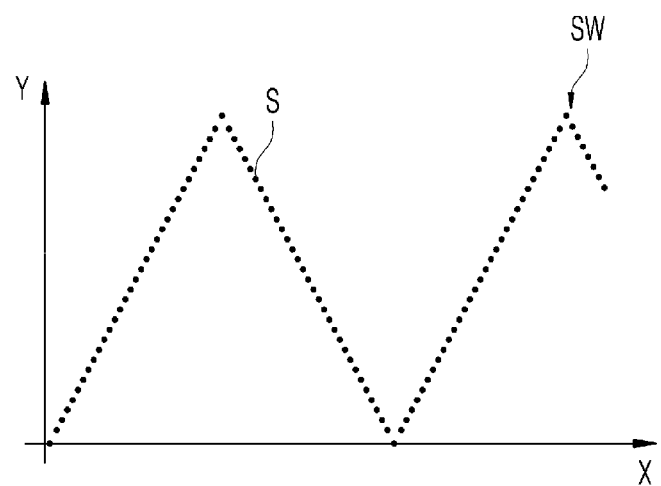
Figure 14C:
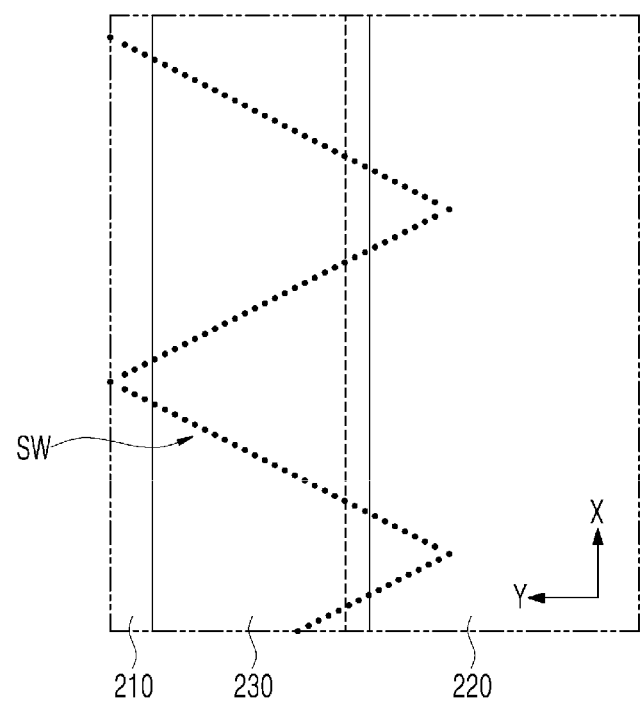

FIG. 14A is a diagram illustrating a position of the ray incident on the subject by a graph according to a time in a thin film characteristic measuring apparatus according to yet another embodiment, FIG. 14B is a graph considering movement of the subject in the graph of FIG. 14A, and FIG. 14C is a diagram illustrating rays incident on the surface of the subject.

Figure 15A:
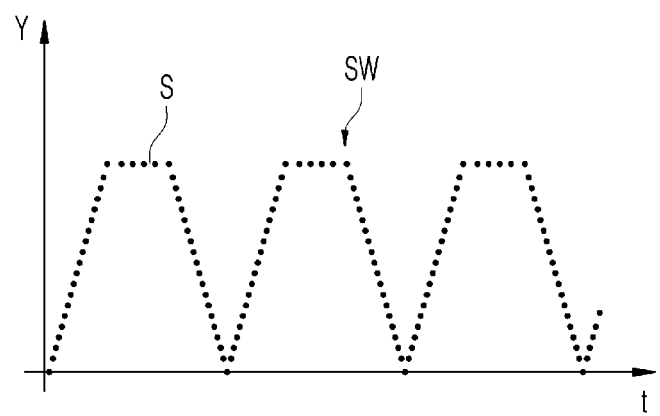
Figure 15B:
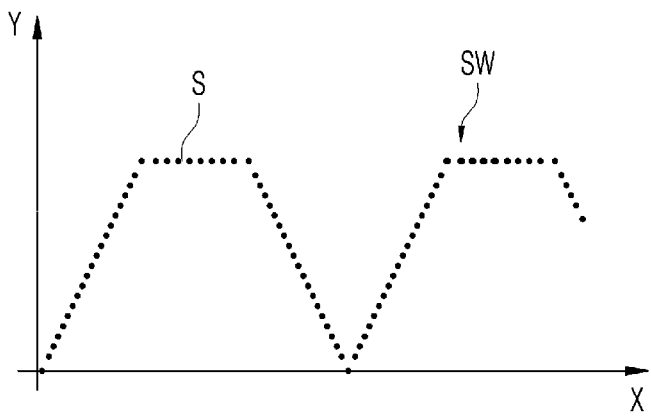
Figure 15C:
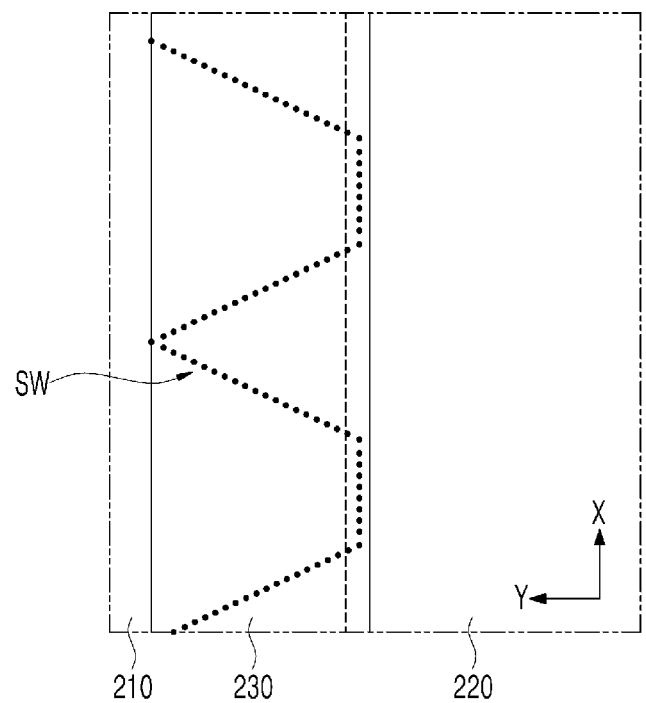

FIG. 15A is a diagram illustrating a position of the ray incident on the subject by a graph according to a time in a thin film characteristic measuring apparatus according to still yet another embodiment, FIG. 15B is a graph considering movement of the subject in the graph of FIG. 15A, and FIG. 15C is a diagram illustrating rays incident on the surface of the subject.

Figure 16A:
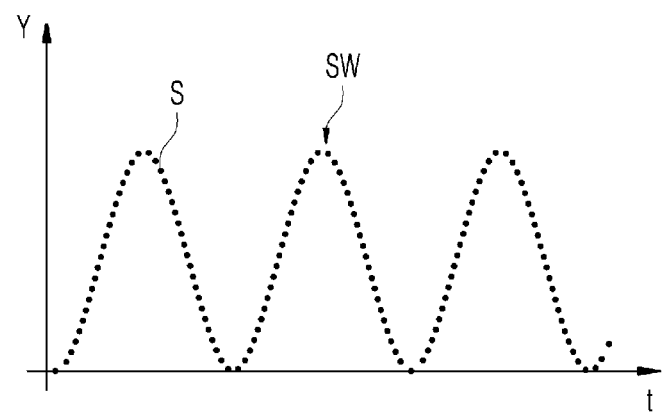
Figure 16B:
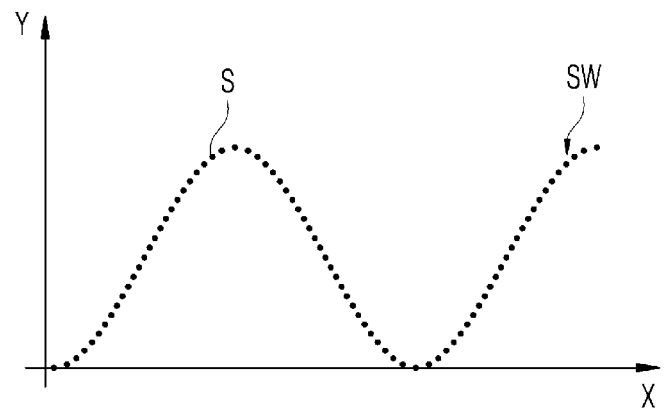
Figure 16C:
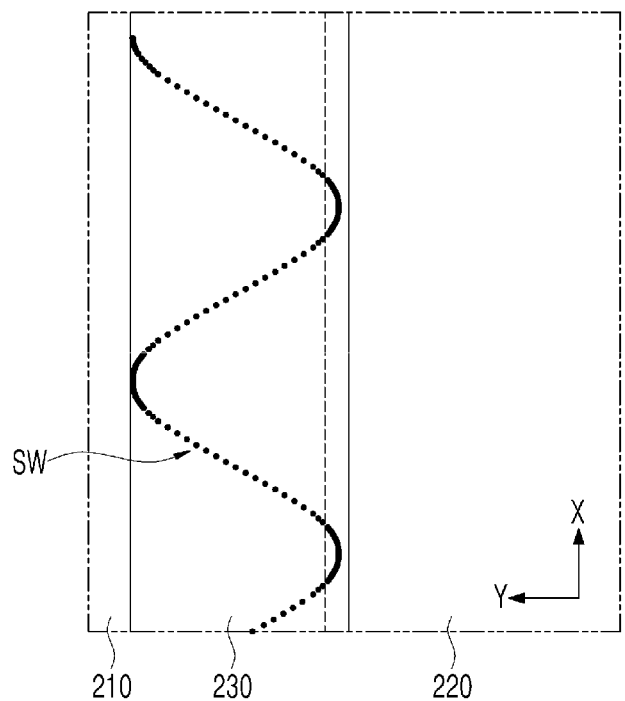

FIG. 16A is a diagram illustrating a position of the ray incident on the subject by a graph according to a time in a thin film characteristic measuring apparatus according to still yet another embodiment, FIG. 16B is a graph considering movement of the subject in the graph of FIG. 16A, and FIG. 16C is a diagram illustrating rays incident on the surface of the subject.

DETAILED DESCRIPTION OF THE PREFERRED EMBODIMENT

Hereinafter, in order to describe the present invention in more detail, embodiments according to the present invention will be described in more detail with reference to the accompanying drawings. Like reference numerals refer to like elements throughout the detailed description.

Figure 1:
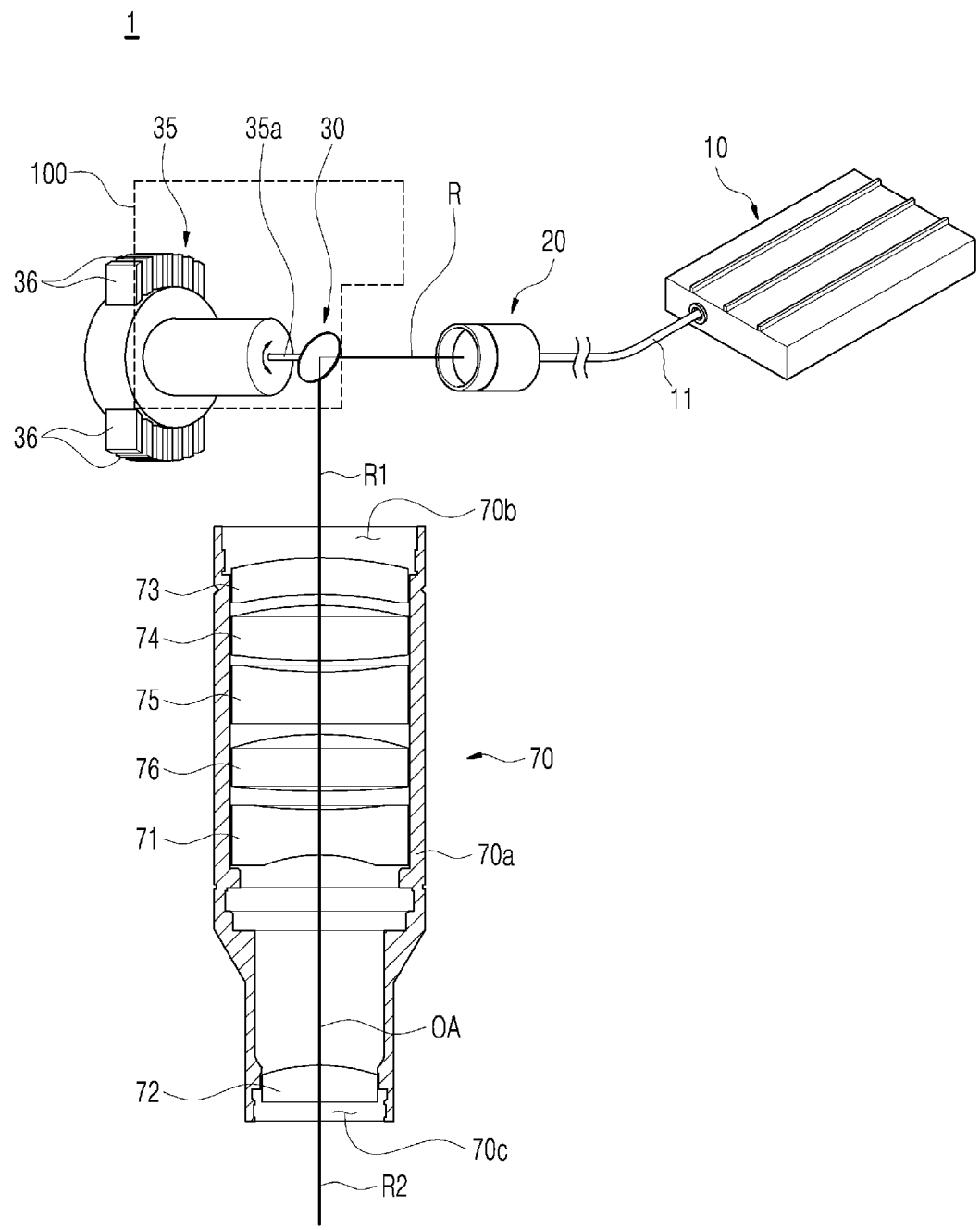
FIGS. 1 and 2 are diagrams schematically illustrating a thin film characteristic measuring apparatus and movement of a ray in the thin film characteristic measuring apparatus, respectively.
Figure 2:
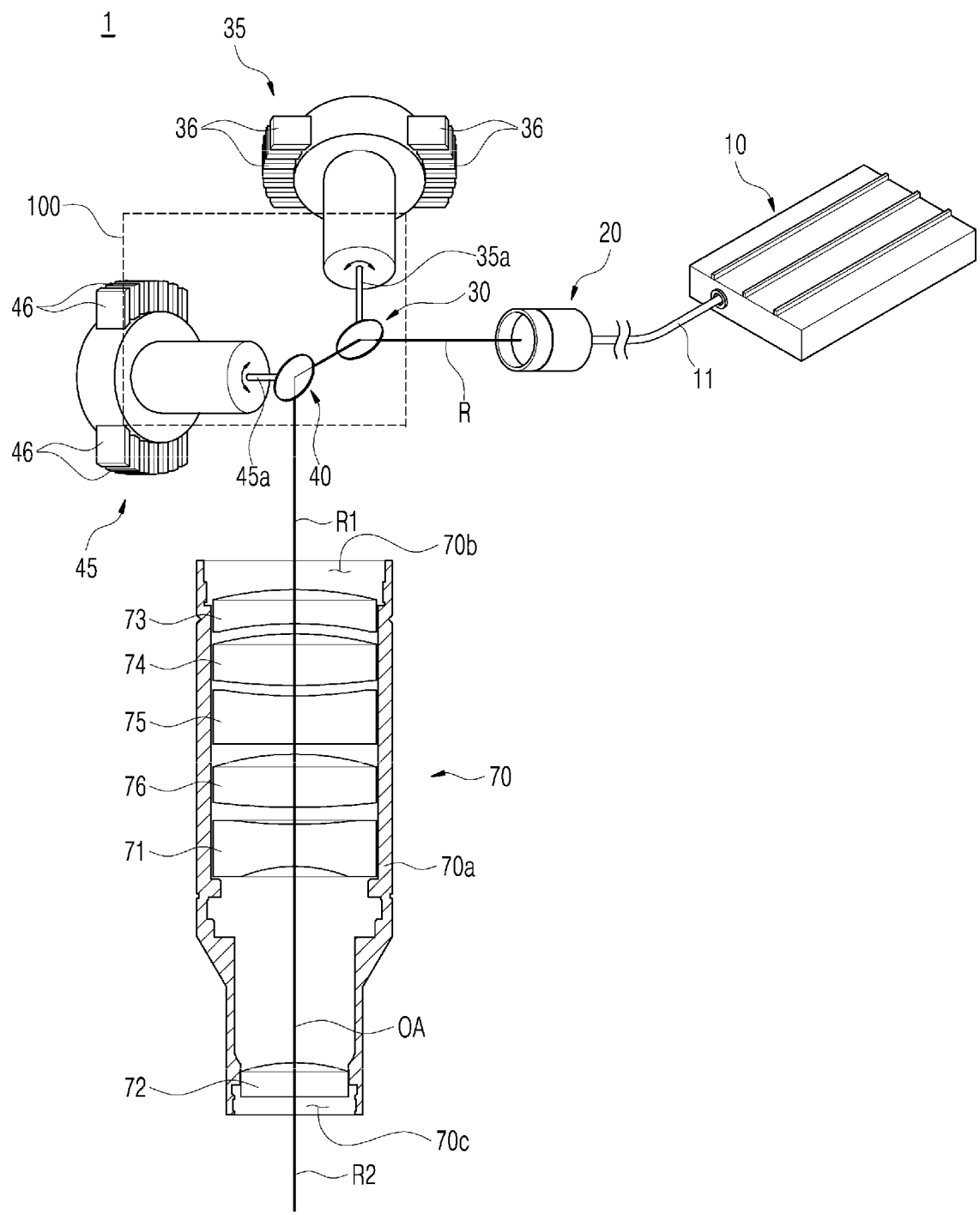

FIGS. 1 and 2 are diagrams schematically illustrating a thin film characteristic measuring apparatus 1 and movement of rays R, R1, and R2 in the thin film characteristic measuring apparatus 1, respectively.

FIG. 3A is a diagram schematically illustrating sections of lenses constituting the lens assembly 70 and rays which are incident on and transmitted to the lens assembly 70 on an optical axis OA of the lens assembly 70.

Each of FIGS. 3B and 3C is a diagram schematically illustrating rays incident on and transmitted to the lens assembly 70 at a spot (off axis) spaced apart from the optical axis OA of the lens assembly 70 in the lens assembly 70 of FIG. 3A.

The measuring apparatus 1 according to an embodiment of the present invention is an apparatus used to measure the thickness and/or the width of the thin film of the subject.

The measuring apparatus 1 (hereinafter, referred to as 'thin film characteristic measuring apparatus 1') is configured to include a light source 10, a first reflection mirror 30, a first actuator 35, and a lens assembly 70.

The ray R1 that is incident on the lens assembly 70 and the ray R2 that is transmitted to the lens assembly 70 are incident on the surface of the subject. The ray reflected on the subject may be incident on the lens assembly 70 again (incident on an outlet 70c of the lens assembly 70), and rays reflected on the subject are analyzed by a separate apparatus, and as a result, the thickness, the refractive index, etc., of the thin film constituting the subject may be calculated.

The light source 10 is configured to irradiate a ray with high luminance and a wide bandwidth.

The light source 10 may be configured to include a superluminescent diode (SLD). Here, the superluminescent diode may also be referred to as a 'superluminescent laser diode'.

The superluminescent diode (or superluminescent laser diode) has both an advantage of laser diodes and characteristics of light-emitting diodes (LED). The superluminescent diode may have characteristics such as ultra-small size, low power consumption, high efficiency, high brightness, and high coupling efficiency with an optical fiber, which are the advantages of the laser diode, and may have the characteristics of low coherence of LED.

The ray irradiated from the light source 10 may have a bandwidth of 5 to 700 nm.

In an embodiment, the ray irradiated from the light source 10 may have a central wavelength of 400 nm or more and a bandwidth of 40 nm or more.

In another embodiment, the light source 10 may have a central wavelength of 100 to 1000 nm of the ray irradiated from the light source 10 and a bandwidth of 400 to 2000 nm of the ray irradiated from the light source 10.

In yet another embodiment, the light source 10 may have a central wavelength of 800 to 900 nm of the ray irradiated from the light source 10 and a bandwidth of 100 to 200 nm of the ray irradiated from the light source 10. More specifically, the light source 10 may have a central wavelength of 850 nm of the ray irradiated from the light source 10 and a bandwidth of 165 nm±82.5 nm of the ray irradiated from the light source 10.

The light source 10 may include an optical fiber 11 that transmits the ray.

The optical fiber 11 may have a diameter of 10 μm or less and a numerical aperture (NA) of 0.3 or less. The optical fiber 11 may have a diameter of 5 μm or less and a numerical aperture (NA) of 0.14.

The first reflection mirror 30 made of a mirror is configured to reflect the ray R irradiated from the light source 10.

The first actuator 35 is configured to reciprocate and tilt the first reflection mirror 30 in a predetermined angle range. The first actuator 35 may be configured to include an electric motor and may be configured to include a step motor.

The first reflection mirror 30 is coupled to a driving shaft (rotation shaft, 35a) of the first actuator 35 including a motor, and while the driving shaft (rotation shaft, 35a) of the first actuator 35 rotates repeatedly in both directions, the first reflection mirror 30 may be tilted reciprocally in a predetermined angle range.

A rotation speed, a rotation angle range, etc. of the driving shaft (rotation shaft, 35a) of the first actuator 35 may be variously changed.

The first reflection mirror 30 and the first actuator 35 may be formed by a galvanometer scanner. That is, the first reflection mirror 30 may be configured as a mirror constituting the galvanometer scanner, and the first actuator 35 may be configured as a motor constituting the galvanometer scanner.

The lens assembly 70 is configured to include a plurality of lenses 71, 72, 73, 74, 75, and 76.

The lens assembly 70 is configured to include a lens body 70a to which the plurality of lenses is fixed. The lens body 70a may be formed in a pipe shape, or may be formed in a circular pipe shape.

An inlet 70b of the lens assembly 70 and an outlet 70c of the lens assembly 70 are formed at both ends of the lens body 70a, respectively.

The inlet 70b of the lens assembly 70 is an opening facing the first reflection mirror 30 and the outlet 70c of the lens assembly 70 is an opening facing the subject.

The ray R1 incident on the inlet 70b of the lens assembly 70 may be transmitted through the lens assembly 70, and then exit to the outlet 70c (R2), and the ray incident on the outlet 70c of the lens assembly 70 may be transmitted through the lens assembly 70, and then exit to the inlet 70b.

In describing the 'direction' of the lens assembly 70 according to an embodiment of the present invention, the inlet 70b of the lens assembly 70 is set as the front of the lens assembly and the outlet 70c of the lens assembly 70 is set as the rear of the lens assembly.

The ray R1 reflected by the first reflection mirror 30 is incident on the front of the lens assembly 70 and transmitted to the rear (rear side of the incident side).

The optical axis OA of the lens assembly 70 may be disposed to be perpendicular to the surface of the subject.

The ray R1 reflected by the first reflection mirror 30 may be incident on the lens assembly 70 to be parallel to the optical axis OA of the lens assembly 70, and transmitted (R2) to be parallel to the optical axis OA of the lens assembly 70 (see FIGS. 1 and 3A).

The ray R1 reflected by the first reflection mirror 30 may be incident on the lens assembly 70 the lens assembly 70 while forming an inclination with the optical axis OA of the lens assembly 70, and transmitted (R2) to be parallel to the optical axis OA of the lens assembly 70 (see FIG. 3A).

The lens assembly 70 may be implemented so that the angle between the main ray of the transmitted ray R2 transmitted through the outlet 70c of the lens assembly 70 and the optical axis OA of the lens assembly 70 is equal to or smaller than the angle between the main ray of the incident ray R1 incident to the inlet 70b of the lens assembly 70 and the optical axis OA of the lens assembly 70, the lens assembly 70 (see FIG. 3A).

In describing an embodiment of the present invention, the 'transmitted ray' may be refracted or not refracted while being transmitted through the lens, etc. The transmitted ray may be a refracted ray.

In an embodiment, the thin film characteristic measuring apparatus 1 may be configured so that the angle between the main ray of the ray R2 which is transmitted through each lens of the lens assembly 70, and exits to the outlet 70c of the lens assembly 70 and the optical axis OA is 0 to 0.1° when the angle between the main ray of the R1 incident on the inlet 70b of the lens assembly 70 and the optical axis OA is 0 to 3.7°. When the angle between the main ray of the ray R1 incident on the inlet 70b of the lens assembly 70 and the optical axis OA is 0°, the angle between the main ray of the ray R2 transmitted through the outlet 70c of the lens assembly 70 and the optical axis OA may be 0°, and when the angle between the main ray of the ray R1 incident on the inlet 70b of the lens assembly 70 and the optical axis OA is 3.7°, the angle between the main ray of the ray R2 transmitted through the outlet 70c of the lens assembly 70 and the optical axis OA may be 0.1° (see FIG. 3A).

The thin film characteristic measuring apparatus 1 may be configured to further include a collimator 20 positioned between the light source 10 and the first reflection mirror 30. The collimator is an optical device for forming a parallel ray.

The numerical aperture (NA) of the collimator 20 may be configured to be larger than the NA of the optical fiber 11 constituting the light source 10. In an embodiment, the NA of the collimator 20 may be configured to be 0.51.

In the thin film characteristic measuring apparatus 1 according to an embodiment of the present invention, the size (diameter) of the ray passing through the collimator 20 may be configured to 50 to 200 μm.

The thin film characteristic measuring apparatus 1 may be configured so that the angle between the main ray of the ray R1 incident on the lens assembly 70 and the optical axis OA is controlled by the first actuator 35.

A center of the first reflection mirror 30 may be positioned on an extension line of the optical axis OA of the lens assembly 70. The ray irradiated from the light source 10 may pass through the collimator 20, and then may be reflected on the center of the first reflection mirror 30, and may be incident on the inlet 70b of the lens assembly 70b along the same line as the optical axis OA. That is, the ray R1 reflected by the first reflection mirror 30 may be incident on the center of the lens assembly 70 in a direction perpendicular to the inlet 70b of the lens assembly 70 (an incident angle is) 0°. In this case, the ray R2 transmitted through the outlet 70c may be incident on the surface of the subject along the same line as the optical axis OA of the lens assembly 70 (a transmission angle is) 0°.

In addition, when the first reflection mirror 30 is tilted in a predetermined angle range, the ray R1 reflected by the first reflection mirror 30 is incident on the lens assembly 70 while the angle is deformed n a predetermined angle range with the optical axis OA of the lens assembly 70 (e.g., the incident angle is deformed between 0 and 3.7°). In this case, the ray R2 transmitted through the outlet 70c may be incident on the surface of the subject in a direction substantially parallel to the optical axis OA of the lens assembly 70 at a spot spaced apart from the optical axis OA. That is, it may be identified that the angle between the main ray of the ray R2 which is transmitted through each lens of the lens assembly 70, and then exists to (is transmitted through) the outlet 70c of the lens assembly 70, and the optical axis OA is even smaller than the angle between the main ray of the R1 incident on the inlet 70b of the lens assembly 70 and the optical axis OA (when the incident angle is 0 to 3.7°, the transmission angle is configured to be 0 to 0.1°) (see FIG. 3A).

As such, in the thin characteristic measuring apparatus 1 according to an embodiment of the present invention, the position of the ray incident on the subject may be easily changed by the first reflection mirror 30 and the first actuator 35, and in this case, all of the rays incident on the subject may be incident perpendicular or substantially perpendicular to the surface of the subject.

The thin film characteristic measuring apparatus 1 may be configured to further include the second reflection mirror 40 and the second actuator 45 (see FIG. 2).

The second reflection mirror 40 made of the mirror is configured to reflect the ray reflected by the first reflection mirror 30. The ray R irradiated from the light source 10 passes through the collimator 20, and then is sequentially reflected by the first reflection mirror 30 and the second reflection mirror 40 to be incident on the lens assembly 70.

The second actuator 45 is configured to reciprocate and tilt the second reflection mirror 40 in a predetermined angle range. The second actuator 45 may be configured to include the electric motor and may be configured to include the step motor.

The second reflection mirror 40 may be coupled to the driving shaft (rotation shaft, 45a) of the second actuator 45 configured to include the motor, and while the driving shaft (rotation shaft, 45a) of the second actuator 45 rotates repeatedly in both directions, the second reflection mirror 40 may be tilted reciprocally in a predetermined angle range.

The rotation speed, the rotation angle range, etc. of the driving shaft (rotation shaft, 45a) of the second actuator 45 may be variously changed.

The second reflection mirror 40 and the second actuator 45 may be formed by the galvanometer scanner. That is, the second reflection mirror 40 may be configured as the mirror constituting the galvanometer scanner, and the second actuator 45 may be configured as the motor constituting the galvanometer scanner.

In the thin film characteristic measuring apparatus 1 according to an embodiment of the present invention, the first reflection mirror 30 and the first actuator 35 may constitute any one galvanometer scanner, and the second reflection mirror 40 and the second reflection mirror 40 may constitute the other one galvanometer scanner.

A tilting shaft (the driving shaft of the first actuator 35, 35a) of the first reflection mirror 30 and a tilting shaft (the driving shaft of the second actuator 45, 45a) of the second reflection mirror 40 may be configured to be parallel to each other or configured not to be parallel to each other.

FIG. 4 is a diagram schematically illustrating some components of the thin film characteristic measuring apparatus 1 and rays R, R1, and R2 transmitted through and reflected on the components.

FIG. 5 is a diagram illustrating a state in which a first reflection mirror 30 and a second reflection mirror 40 are tilted in the thin film characteristic measuring apparatus 1 of FIG. 4.

Each of FIGS. 6A, 6B, 6C, 6D, 6E, and 6F is a diagram illustrating a state in which rays transmitted through the lens assembly travels differently according to degrees at which the first reflection mirror 30 and the second reflection mirror 40 are tilted in the thin film characteristic measuring apparatus 1 of FIGS. 4 and 5.

FIG. 7 is a diagram illustrating a state in which a first transparent plate 50 and a second transparent plate 60 are tilted in the thin film characteristic measuring apparatus 1 of FIG. 4.

Each of FIGS. 8A, 8B, 8C, 8D, 8E, and 8F is a diagram illustrating a state in which rays transmitted through the lens assembly travels differently according to degrees at which the first transparent plate 50 the second transparent plate 60 are tilted in the thin film characteristic measuring apparatus 1 of FIGS. 4 and 7.

The thin film characteristic measuring apparatus according to an embodiment of the present invention can be configured to include the first transparent plate 50, a third actuator 55, the second transparent plate 60, and a fourth actuator 65.

The first transparent plate 50 is formed in the form of a transparent plate. The first transparent plate 50 may be made of transparent glass.

The ray R irradiated from the light source 10 may be transmitted through the first transparent plate 50.

The ray irradiated from the light source 10 may pass through the collimator 20, and then be transmitted through the first transparent plate 50.

The third actuator 55 is configured to reciprocate and tilt the first transparent plate 50 in a predetermined angle range. The third actuator 55 may be configured to include the electric motor and may be configured to include the step motor.

The first reflection plate 50 may be coupled to the driving shaft (rotation shaft, 55a) of the third actuator 55 configured to include the motor, and while the driving shaft (rotation shaft, 55a) of the third actuator 55 rotates repeatedly in both directions, the first transparent plate 50 may be tilted reciprocally in a predetermined angle range.

The rotation speed, the rotation angle range, etc. of the driving shaft (rotation shaft, 55a) of the third actuator 55 may be variously changed.

The second transparent plate 60 is formed in the form of a transparent plate. The second transparent plate 60 may be made of the transparent glass.

The ray transmitted through the first transparent plate 50 may be incident on the second transparent plate 60, and then transmitted through the second transparent plate 60.

The ray transmitted through the second transparent plate 60 may be incident on the first reflection mirror 30.

The fourth actuator 65 is configured to reciprocate and tilt the second transparent plate 60 in a predetermined angle range. The fourth actuator 65 may be configured to include the electric motor and may be configured to include the step motor.

The second reflection plate 60 may be coupled to the driving shaft (rotation shaft, 65a) of the fourth actuator 65 configured to include the motor, and while the driving shaft (rotation shaft, 65a) of the fourth actuator 65 rotates repeatedly in both directions, the second transparent plate 60 may be tilted reciprocally in a predetermined angle range.

The rotation speed, the rotation angle range, etc. of the driving shaft (rotation shaft, 65a) of the fourth actuator 65 may be variously changed.

A tilting shaft (the driving shaft of the third actuator 55, 55a) of the first transparent plate 50 and a tilting shaft (the driving shaft of the fourth actuator 65, 65a) of the second transparent plate 60 may be configured to be parallel to each other or configured not to be parallel to each other.

In the thin film characteristic measuring apparatus 1, the ray sequentially transmitted through the first transparent plate 50 and the second transparent plate 60 may be configured to be refracted by the first reflection mirror 30 and the second reflection mirror 40, and then to be incident on the lens assembly 70.

Tilting angles of the first transparent plate 50 and the second transparent plate 60 are adjusted, and as a result, the position of the ray incident on the first reflection mirror 30 may be changed.

The thin film characteristic measuring apparatus 1 according to an embodiment of the present invention adjusts the tilting angles of the first transparent plate 50 and the second transparent plate 60 and/or the tilting angles of the first reflection mirror 30 and the second reflection mirror 40 to variously adjust the angle and the position of the ray R1 incident on the lens assembly 70 and the angle and the position of the ray R2 transmitted through the lens assembly 70 and incident on the subject.

In an embodiment, the tilting angles of the first reflection mirror 30 and the second reflection mirror 40 are adjusted, and as a result, the ray R2 transmitted through the lens assembly 70, and then incident on the subject may be spaced apart from the optical axis OA of the lens assembly 70. In this case, the ray R2 transmitted through the lens assembly 70, and then incident on the subject may be configured to be substantially parallel to the optical axis OA of the lens assembly 70.

FIGS. 6A, 6B, 6C, 6D, 6E, and 6F illustrate states in which the rays R2 transmitted through the lens assembly 70, and then incident on the subject travel differently when the tilting degrees (angles) of the first reflection mirror 30 and the second reflection mirror 40 are differently adjusted, respectively.

As such, the ray R2 transmitted through the lens assembly 70, and then incident on the subject may be incident on a predetermined area A, and the tilting angles of the first reflection mirror 30 and the second reflection mirror 40 are differently adjusted to differently adjust the position of the ray R2 incident on the area A.

As described above, by the thin film characteristic measuring apparatus 1 according to an embodiment of the present invention, several parts of the subject may be inspected.

In another embodiment, the tilting angles of the first transparent plate 50 and the second transparent plate 60 are adjusted, and as a result, the ray R2 transmitted through the lens assembly 70 may be configured to be incident on the subject while forming an inclination with the optical axis OA of the lens assembly 70 at the site spaced apart from the optical axis OA of the lens assembly 70 (see FIGS. 3B and 3C).

FIGS. 8A, 8B, 8C, 8D, 8E, and 8F illustrate states in which the rays R2 transmitted through the lens assembly 70, and then incident on the subject travel differently when the tilting degrees (angles) of the first transparent plate 50 and the second transparent plate 60 are differently adjusted, respectively.

As such, the ray R2 transmitted through the lens assembly 70, and then incident on the subject may be incident on a predetermined area A, and the tilting angles of the first transparent plate 50 and the second transparent plate 60 are differently adjusted to differently adjust the angle of the ray R2 incident on the area A.

As described above, by the thin film characteristic measuring apparatus 1 according to an embodiment of the present invention, even when the surface of the subject forms a convex curve, the ray may be incident on the direction perpendicular to the surface of the subject.

The lens assembly 70 according to an embodiment of the present invention may be configured to include a first lens 71, a second lens 72, a third lens 73, a fourth lens 74, and a fifth lens 75.

The lens assembly 70 may be configured to further include a sixth lens 76.

The arrangement positions of the first lens 71 and the second lens 72 may be fixed, and the third lens 73, the fourth lens 74, the fifth lens 75 and the sixth lens 76 may be changed.

The first lens 71 is formed by a negative lens. The first lens 71 is formed by an asymmetrical biconcave lens.

The second lens 72 is disposed behind the first lens 71 and formed by a positive lens. The second lens 72 may be formed by a plano-convex lens.

The second lens 73 is disposed in front of the first lens 71 and formed by the positive lens. The third lens 73 is formed by a positive meniscus lens.

The fourth lens 74 is disposed between the third lens 73 and the first lens 71, and formed by the positive lens. The fourth lens 74 may be disposed in front of the fifth lens 75.

The fourth lens 74 is formed by an asymmetrical double-convex lens.

The fifth lens 75 is disposed between the third lens 73 and the first lens 71, and formed by the negative lens. The fifth lens 75 may be formed by a plano-concave lens.

The sixth lens 76 is disposed between the fifth lens 75 and the first lens 71, and formed by the positive lens. The sixth lens 76 is formed by the asymmetrical double-convex lens.

FL1 which is a sum of focal lengths of the third lens 73, the fourth lens 74, the fifth lens 75, and the sixth lens 76 may be configured to be shorter than FL2 which is a sum of focal lengths of the third lens 73, the fourth lens 74, the fifth lens 75, the sixth lens 76, and the first lens 71.

A focal length FL3 the second lens 72 may be longer than the FL1 and shorter than the FL2.

In the thin film characteristic measuring apparatus 1, when the diameter of the first area A1, which is an area formed by the ray incident on the third lens 73 parallel to the optical axis OA of the lens assembly 70, is D1, and the diameter of the second area A2, which is an area formed by the ray which is transmitted through the lens assembly 70 and touching the surface of the subject, is D2, the FL3/FL2 value may be within the range of ±10% of the D2/D1 value (see FIGS. 3A to 3C).

In the thin film characteristic measuring apparatus 1, when the distance between the first reflection mirror 30 and the third lens 73 is L1 and the distance between the second lens 72 and the subject is L2, L1 and L2 may be 20 mm or more, and the effective focal length of the lens assembly 70 may be 85 mm.

Each of L1 and L2 may be formed as 20 mm.

A length from the third lens 73 to the second lens 72 in the lens assembly 70 may be 89 mm.

When the ray R1 reflected by the first reflection mirror 30 is incident on the lens assembly 70, the center of the first reflection mirror 30 and the center of the first area A1 may coincide with each other.

When the ray R2 reflected by the second reflection mirror 40 is incident on the lens assembly 70, the center of the second reflection mirror 40 and the center of the first area A1 may coincide with each other.

When the ray R1 is incident on the lens assembly 70 from the center of the first area A1, the ray R2 transmitted through the lens assembly 70 and incident on the second area A2 is perpendicular or substantially perpendicular to the second area A2 (see FIG. 3A).

When the ray R1 is incident on the lens assembly 70 from a spot which deviates from the center of the first area A1 (from the off axis), the ray transmitted through the lens assembly 70 and incident on the second area A2 may form an angel of 0 to 20° with the optical axis OA of the lens assembly 70.

For example, when the ray R1 is incident on the lens assembly 70 from the edge of the first area A1, the ray R2 transmitted through the lens assembly 70 and incident on the second area A2 forms the inclination with the optical axis OA of the lens assembly 70. In this case, even though the main rays R1 of the ray incident on the lens assembly 70 form different angles with the optical axis OA of the lens assembly 70, the main rays R2 of the ray transmitted through the lens assembly 70 and incident on the second area are parallel to each other or substantially parallel to each other (see FIGS. 3B and 3C).

The thin film characteristic measuring apparatus 1 may include a case 100.

The case 100 may be formed in a box shape. The case 100 may be made of a relatively hard material. The case 100 may be made of plastic, metal etc.

The inlet 70b of the lens assembly 70 and the first actuator 35 may be fixed to the case 100.

The first reflection mirror 30 is accommodated in the case 100, and the case 100 includes an opening opened toward the collimator 20.

When the thin film characteristic measuring apparatus 1 includes the second reflection mirror 40 and the second actuator 45, the second actuator 45 may also be fixed to the case 100, and the second reflection mirror 40 may be accommodated in the case 100.

A plurality of heat dissipation fins 36 may be formed on the first actuator 35. The heat dissipation fins 36 of the first actuator 35 may be made of a metallic material having excellent thermal conductivity, and the plurality of heat dissipation fins 36 of the first actuator 35 are spaced apart from each other.

Further, a plurality of heat dissipation fins 46 may be formed on the first actuator 45. The heat dissipation fins 46 of the second actuator 45 may be made of the metallic material having excellent thermal conductivity, and the plurality of heat dissipation fins 46 of the second actuator 45 are spaced apart from each other.

Each of FIGS. 9A, 9B, and 9C is a diagram schematically illustrating a state in which rays R having the refraction element 80 move.

The thin film characteristic measuring apparatus 1 may further include a diffractive optical element 80 positioned between the light source 10 and the lens assembly 70.

A ray may be branched into several rays while passing through the diffractive optical element 80.

In an embodiment, the ray through passing the diffractive optical element 80 may be branched into 3×3 (9 rays) and in another embodiment, the ray passing through the diffractive optical element 80 may be branched into 5×5 (25 rays).

The rays branched while passing through the diffractive optical element 80 may be incident and emitted (transmitted) at different spots of the lens assembly 70, and as a result, the ray may be irradiated and measured (inspected) at several spots of the subject.

Hereinafter, a method for measuring the thickness and the width of a film constituting the subject using the thin film characteristic measuring apparatus 1 according to an embodiment of the present invention will be described.

FIG. 10 is a diagram schematically illustrating a state of inspecting the subject 200 by using the thin film characteristic measuring apparatus 1.

FIG. 11 is a diagram schematically illustrating the section of the subject 200 of FIG. 10 and the ray incident on and reflected on the subject 200.

FIG. 12A is a diagram illustrating a position of the ray incident on the subject by a graph according to a time in the thin film characteristic measuring apparatus according to an embodiment, FIG. 12B is a graph considering movement of the subject in the graph of FIG. 12A, and FIG. 12C is a diagram illustrating rays incident on the surface of the subject.

FIG. 13A is a diagram illustrating a position of the ray incident on the subject by a graph according to a time in a thin film characteristic measuring apparatus according to another embodiment, FIG. 13B is a graph considering movement of the subject in the graph of FIG. 13A, and FIG. 13C is a diagram illustrating rays incident on the surface of the subject.

FIG. 14A is a diagram illustrating a position of the ray incident on the subject by a graph according to a time in a thin film characteristic measuring apparatus according to yet another embodiment, FIG. 14B is a graph considering movement of the subject in the graph of FIG. 14A, and FIG. 14C is a diagram illustrating rays incident on the surface of the subject.

FIG. 15A is a diagram illustrating a position of the ray incident on the subject by a graph according to a time in a thin film characteristic measuring apparatus according to yet another embodiment, FIG. 15B is a graph considering movement of the subject in the graph of FIG. 15A, and FIG. 15C is a diagram illustrating rays incident on the surface of the subject.

An X direction, a Y direction, and a Z direction indicated FIG. 10 and below are directions orthogonal to each other.

The subject 200 may be a battery of a vehicle. The subject 200 may be a part of the battery.

The battery 200 constituting the subject may include an aluminum foil 210, an active material 220, and an insulating film 230.

The aluminum foil 210 may form a collector of a positive electrode.

An active material 220 is laminated on the aluminum foil 210.

The insulating film 230 is laminated on the aluminum foil 210 and the active material 220, and the insulating film 230 is formed along the edge of the active material 220. The insulating film 230 may be made of Polyvinylidene fluoride (PVDF).

The thin film characteristic measuring apparatus 1 according to an embodiment of the present invention may be used to measure the thickness and the width of the insulating film 230 in the subject 200. In measuring the subject 200, the subject 200 may move in a direction X parallel to the longitudinal direction of the insulating film 230.

Characteristics of the reflected ray R3 of the ray R2 irradiated from the thin film characteristic measuring apparatus 1 and incident on the subject 200 may vary depending on the position of the subject, and inference of the reflected ray R3 may be shown differently, and as a result, characteristics of the reflected rays R3 are determined to measure the width and the thickness of the insulating film 230.

A tilting axis of the first reflection mirror 30 may be placed parallel to the movement direction X of the subject 200.

As the first reflection mirror 30 is tilted reciprocally, the ray R2 incident on the subject 200 and the reflected ray of the ray R2 reciprocally move (M1) in a direction Y orthogonal to the direction X of the tilting axis of the first reflection mirror 30.

In addition, as the first reflection mirror 30 is tilted reciprocally, when the ray R2 irradiated from the thin film characteristic measuring apparatus 1 is represented by a spot, the position of the spot (hereinafter, referred to as 'spot) varies depending on a time t, and as a result, the position of the spot S may be represented as a graph according to the time t.

The spot S according to the time t may be formed by various waveforms (hereinafter, referred to as 'waveform of spot'), and a wavelength, a frequency, an amplitude, etc., of each spot waveform SW may be variously formed.

In an embodiment, the spot waveform SW may be formed in the form of a sine wave.

In another embodiment, the spot waveform SW may be formed in the form of a triangular wave (see FIGS. 13A and 14A).

In yet another embodiment, the spot waveform SW may be formed in the form of a square wave or a form similar thereto (see FIG. 15).

Considering the movement of the subject 200 jointly, i.e., when the subject 200 moves, the spot waveform SW on the surface of the subject 200 is shown in a form in which the wavelength becomes longer as much as a movement speed of the subject 200 (see FIGS. 12B, 13B, 14B, 15B, and 16B).

In an embodiment, the amplitude of the spot waveform SW is relatively small so that each spot may be positioned within the range of the width of the insulating film 230 of the subject 200. For example, when the expected width of the insulating film 230 is approximately 4 mm, the thin film characteristic measuring apparatus 1 may be controlled so that the a double value (peak to peak) of the spot waveform SW becomes 1.2 mm, and further in this case, the relative positions of the thin film characteristic measuring apparatus 1 and the subject 200 may be adjusted so that the spot is located on the insulating film 230 of the subject.

In another embodiment, the amplitude of the spot waveform SW is relatively large so that each spot may also move to the ranges of formation of the aluminum foil 210 and the active material 220 in addition to the insulating film 230 of the subject (see FIG. 14C). For example, when the expected width of the insulating film 230 is approximately 4 mm, the thin film characteristic measuring apparatus 1 may be controlled so that the double value (peak to peak) of the spot waveform SW is 5.5 mm to 11 mm.

When the amplitude of the spot waveform SW is relatively small, as compared with the case where amplitude of the spot waveform SW is relatively large, a tilting speed (Hz) of the first reflection mirror 30 may be faster. In an embodiment, when the double value of the amplitude of the spot waveform SW is 5.5 mm, the tilting speed (Hz) of the first reflection mirror 30 may be 175 Hz, and when the double value of the amplitude of the spot waveform SW is 1.2 mm, the tilting speed (Hz) of the first reflection mirror 30 may be 1 kHz.

Accordingly, when the thickness of the insulating film 230 is to be measured quickly, the thin film characteristic measuring apparatus 1 may be controlled such that the amplitude of the spot waveform SW is relatively small.

Further, when the thickness and the width of the insulating film 230 is to be measured jointly, the thin film characteristic measuring apparatus 1 may be controlled such that the amplitude of the spot waveform SW is relatively large.

Hereinabove, a specific embodiment of the present disclosure is described and illustrated, but the present invention is not limited to the disclosed embodiment, and it may be appreciated by those skilled in the art that the embodiment can be variously modified and transformed to another specific embodiment without departing from the spirit and the scope of the present invention. Therefore, the scope of the present invention will not be defined by the described embodiment, but defined by the technical spirit disclosed in the claims.

INDUSTRIAL APPLICABILITY

The thin film characteristic measuring apparatus according to an embodiment of the present invention, in that a thin film characteristic measuring apparatus can be provided, in which the light source is formed by a wideband laser light source, and while the first reflection mirror is repeatedly tilted in a predetermined angle range, the rays transmitted through the lens assembly may reciprocally on the incident surface of the subject while keeping being parallel to each other, and as a result, a position to be measured, a method, etc., may be variously adjusted, there is a remarkable industrial applicability.

What is claimed is:

1. A thin film characteristic measuring apparatus used for measuring a thickness or a width of a thin film of a subject, the thin film characteristic measuring apparatus comprising:
   a light source including a superluminescent diode (SLD);
   a first reflection mirror configured to reflect a ray irradiated from the light source;
   a first actuator configured to tilt the first reflection mirror in a predetermined angle range; and
   a lens assembly including a plurality of lenses, and in which the ray reflected by the first reflection mirror is incident and transmitted,
   wherein the lens assembly is configured so that an angle of a main ray of the ray transmitted through the lens assembly with respect to an optical axis is greater than or equal to an angle of the main ray of the ray incident on the lens assembly with respect to the optical axis,
wherein the plurality of lenses are configured to expand a diameter of the ray and reflect the ray towards the subject at different spots in a predetermined section of the subject,
wherein the diameter of the ray is expanded while passing through the plurality of lenses, and the diameter of the ray is constant after exiting the plurality of lenses, and
wherein, after the ray exits the lens assembly, the ray is non-parallel to the optical axis.

2. The thin film characteristic measuring apparatus of claim 1, wherein the ray irradiated from the light source has a center wavelength of 800 to 900 nm and a bandwidth of 100 to 200 nm.

3. The thin film characteristic measuring apparatus of claim 1, wherein the light source includes an optical fiber configured to deliver the ray, and
wherein the optical fiber has a diameter of 10 μm or less and a numerical aperture (NA) of 0.3 or less.

4. The thin film characteristic measuring apparatus of claim 1, further comprising a collimator positioned between the light source and the first reflection mirror,
wherein the light source includes an optical fiber configured to deliver the ray, and
wherein a numerical aperture (NA) of the collimator is larger than a NA of the optical fiber.

5. The thin film characteristic measuring apparatus of claim 4, wherein the optical fiber has a diameter of 10 μm or less, and
wherein a size (diameter) of the ray passing through the collimator is 50 to 200 μm.

6. The thin film characteristic measuring apparatus of claim 1, wherein the angle of the main ray of the ray incident on the lens assembly is controlled by the first actuator.

7. The thin film characteristic measuring apparatus of claim 1, wherein a center of the first reflection mirror is positioned on an extension line of the optical axis of the lens assembly.

8. The thin film characteristic measuring apparatus of claim 1, further comprising:
a second reflection mirror configured to reflect the ray reflected by the first reflection mirror; and
a second actuator configured to reciprocate and tilt the second reflection mirror in a predetermined angle range,
wherein the ray reflected by the second reflection mirror is incident on the lens assembly.

9. The thin film characteristic measuring apparatus of claim 8, further comprising:
a first transparent plate through which the ray irradiated from the light source is configured to be transmitted;
a third actuator configured to reciprocate and tilt the first transparent plate in a predetermined angle range;
a second transparent plate through which the ray transmitted through the first transparent plate is configured to be transmitted; and
a fourth actuator configured to reciprocate and tilt the second transparent plate in a predetermined angle range,
wherein a tilting axis of the first transparent plate and a tilting axis of the second transparent plate are different from each other, and
wherein the ray transmitted through the second transparent plate is refracted by the first reflection mirror and the second reflection mirror, and then incident on the lens assembly.

10. A thin film characteristic measuring apparatus used for measuring a thickness or a width of a thin film of a subject, the thin film characteristic measuring apparatus comprising:
a light source including a superluminescent diode (SLD);
a first reflection mirror configured to reflect a ray irradiated from the light source;
a first actuator configured to tilt the first reflection mirror in a predetermined angle range; and
a lens assembly including a plurality of lenses, and in which the ray reflected by the first reflection mirror is incident and transmitted,
wherein the lens assembly includes:
a first lens that is a negative lens,
a second lens disposed behind the first lens, the second lens being a positive lens,
a third lens disposed in front of the first lens, the third lens being a positive lens,
a fourth lens disposed between the third lens and the first lens, the fourth lens being a positive lens, and
a fifth lens disposed between the third lens and the first lens, the fifth lens being a negative lens,
wherein the plurality of lenses are configured to expand a diameter of the ray and reflect the ray towards the subject at different spots in a predetermined section of the subject,
wherein the diameter of the ray is expanded while passing through the plurality of lenses, and the diameter of the ray is constant after exiting the plurality of lenses,
wherein the lens assembly is configured so that an angle of a main ray of the ray transmitted through the lens assembly with respect to an optical axis is greater than or equal to an angel of the main ray of the ray incident on the lens assembly with respect to the optical axis, and
wherein, after the ray exits the lens assembly, the ray is non-parallel to the optical axis.

11. The thin film characteristic measuring apparatus of claim 10, wherein the lens assembly further includes a sixth lens disposed between the fifth lens and the first lens, the sixth lens being a positive lens, and
wherein the fourth lens is disposed in front of the fifth lens.

12. The thin film characteristic measuring apparatus of claim 11, wherein FL1 which is a sum of focal distances of the third lens, the fourth lens, the fifth lens, and the sixth lens is shorter than FL2 which is a sum of focal distances of the third lens, the fourth lens, the fifth lens, the sixth lens, and the first lens, and
wherein a focal distance FL3 of the second lens is longer than the FL1 and shorter than the FL2.

13. The thin film characteristic measuring apparatus of claim 11, wherein in response to a diameter of an area formed by the ray incident on the third lens parallel to the optical axis of the lens assembly being D1, the diameter of an area formed when the ray transmitted through the lens assembly touches a surface of the subject being D2, a sum of focal distances of the third lens, the fourth lens, the fifth lens, the sixth lens, and the first lens being FL2, and the focal distance of the second lens being FL3, a value of FL3/FL2 is within a range of ±10% of a value of D2/D1.

14. The thin film characteristic measuring apparatus of claim 11, wherein in response to a distance between the first reflection mirror and the third lens being L1, and a distance between the second lens and the subject is L2, L1 and L2 being 20 mm or more, an effective focal distance of the lens assembly is 85 mm.

15. The thin film characteristic measuring apparatus of claim 11, wherein the first lens is an asymmetrical biconcave lens,
wherein the second lens is a plano-convex lens,
wherein the third lens is a positive meniscus lens,
wherein the fourth lens is an asymmetrical double-convex lens,
wherein the fifth lens is a plano-concave lens, and
wherein the sixth lens is an asymmetrical double-convex lens.

16. The thin film characteristic measuring apparatus of claim 10, further comprising:
a collimator positioned between the light source and the first reflection mirror; and
a case to which the lens assembly and the first actuator are fixed, and which accommodates the first reflection mirror, and is opened toward the collimator.

17. The thin film characteristic measuring apparatus of claim 16, wherein a plurality of heat dissipation fins are located in the first actuator.

18. The thin film characteristic measuring apparatus of claim 10, further comprising a diffractive optical element positioned between the light source and the lens assembly.

* * * * *